(12) United States Patent
Stowe et al.

(10) Patent No.: US 9,430,507 B2
(45) Date of Patent: Aug. 30, 2016

(54) DISTRIBUTED ACOUSTIC SENSING DATA ANALYSIS SYSTEM

(71) Applicant: Palantir Technologies Inc., Palo Alto, CA (US)

(72) Inventors: Geoff Stowe, Palo Alto, CA (US); Ankit Shankar, Palo Alto, CA (US); Chris Rogers, Vienna, VA (US); Benedict Cappellacci, New York, NY (US); Kimberly Sparling, San Francisco, CA (US); Lucas Lemanowicz, New York, NY (US); John McRaven, New York, NY (US); Andrew Pettit, New York, NY (US)

(73) Assignee: Palantir Technologies, Inc., Palo Alto, CA (US)

( * ) Notice: Subject to any disclaimer, the term of this patent is extended or adjusted under 35 U.S.C. 154(b) by 0 days.

(21) Appl. No.: 14/961,481

(22) Filed: Dec. 7, 2015

(65) Prior Publication Data

US 2016/0162519 A1 Jun. 9, 2016

Related U.S. Application Data

(60) Provisional application No. 62/089,076, filed on Dec. 8, 2014.

(51) Int. Cl.
*G06F 17/30* (2006.01)
(52) U.S. Cl.
CPC ... *G06F 17/30306* (2013.01); *G06F 17/30392* (2013.01); *G06F 17/30595* (2013.01)
(58) Field of Classification Search
CPC .......................... G06F 17/30; G06F 17/30306
USPC .................................................. 707/600–899
See application file for complete search history.

(56) References Cited

U.S. PATENT DOCUMENTS 5,241,625 A 8/1993 Epard et al.
5,845,300 A 12/1998 Comer
(Continued)

FOREIGN PATENT DOCUMENTS

CN 102054015 5/2011
EP 1 672 527 6/2006
(Continued)

OTHER PUBLICATIONS

"GrabUp—What a Timesaver!" http://atlchris.com/191/grabup/, Aug. 11, 2008, pp. 3.
(Continued)

*Primary Examiner* — Isaac M Woo
(74) *Attorney, Agent, or Firm* — Knobbe, Martens, Olson & Bear LLP

(57) ABSTRACT

Various systems and methods are provided that retrieve data measured by various sensors associated with a sensor collection site and compress the retrieved data so that the compressed data can be transported to and stored in one or more databases in an efficient manner. The various systems and methods may further retrieve the data stored in the one or more databases and generate an interactive user interface to display the data. While each instance of measured data may include a plurality of parameters, the various systems and methods may flatten the measured data such that information pertaining to each parameter can be displayed in a two-dimensional graph. Features may be extracted from the stored data to identify events that have occurred or that may occur in the future during operation of the sensor collection site such that a user can take appropriate action.

20 Claims, 18 Drawing Sheets

(56) References Cited

U.S. PATENT DOCUMENTS

| | | |
|---|---|---|
| 5,999,911 A | 12/1999 | Berg et al. |
| 6,065,026 A | 5/2000 | Cornelia et al. |
| 6,237,138 B1 | 5/2001 | Hameluck et al. |
| 6,243,706 B1 | 6/2001 | Moreau et al. |
| 6,370,538 B1 | 4/2002 | Lamping et al. |
| 6,430,305 B1 | 8/2002 | Decker |
| 6,523,019 B1 | 2/2003 | Borthwick |
| 6,944,821 B1 | 9/2005 | Bates et al. |
| 7,086,028 B1 | 8/2006 | Davis et al. |
| 7,174,377 B2 | 2/2007 | Bernard et al. |
| 7,213,030 B1 | 5/2007 | Jenkins |
| 7,392,254 B1 | 6/2008 | Jenkins |
| 7,441,182 B2 | 10/2008 | Beilinson et al. |
| 7,877,421 B2 | 1/2011 | Berger et al. |
| 7,880,921 B2 | 2/2011 | Dattilo et al. |
| 7,941,336 B1 | 5/2011 | Robin-Jan |
| 7,958,147 B1 | 6/2011 | Turner et al. |
| 8,010,507 B2 | 8/2011 | Poston et al. |
| 8,073,857 B2 | 12/2011 | Sreekanth |
| 8,290,838 B1 | 10/2012 | Thakur et al. |
| 8,302,855 B2 | 11/2012 | Ma et al. |
| 8,688,573 B1 | 4/2014 | Rukonic et al. |
| 8,732,574 B2 | 5/2014 | Burr et al. |
| 8,938,686 B1 | 1/2015 | Erenrich et al. |
| 8,984,390 B2 | 3/2015 | Aymeloglu et al. |
| 9,058,315 B2 | 6/2015 | Burr et al. |
| 2002/0032677 A1 | 3/2002 | Moregenthaler et al. |
| 2002/0095360 A1 | 7/2002 | Joao |
| 2002/0103705 A1 | 8/2002 | Brady |
| 2003/0093755 A1 | 5/2003 | O'Carroll |
| 2003/0126102 A1 | 7/2003 | Borthwick |
| 2004/0034570 A1 | 2/2004 | Davis |
| 2004/0044648 A1 | 3/2004 | Anfindsen et al. |
| 2004/0205492 A1 | 10/2004 | Newsome |
| 2004/0236688 A1 | 11/2004 | Bozeman |
| 2005/0010472 A1 | 1/2005 | Quatse et al. |
| 2005/0039116 A1 | 2/2005 | Slack-Smith |
| 2005/0091186 A1 | 4/2005 | Elish |
| 2006/0026561 A1 | 2/2006 | Bauman et al. |
| 2006/0031779 A1 | 2/2006 | Theurer et al. |
| 2006/0053097 A1 | 3/2006 | King et al. |
| 2006/0053170 A1 | 3/2006 | Hill et al. |
| 2006/0059423 A1 | 3/2006 | Lehmann et al. |
| 2006/0136513 A1 | 6/2006 | Ngo et al. |
| 2006/0143075 A1 | 6/2006 | Carr et al. |
| 2006/0265417 A1 | 11/2006 | Amato et al. |
| 2006/0277460 A1 | 12/2006 | Forstall et al. |
| 2007/0000999 A1 | 1/2007 | Kubo et al. |
| 2007/0043686 A1 | 2/2007 | Teng et al. |
| 2007/0061752 A1 | 3/2007 | Cory |
| 2007/0113164 A1 | 5/2007 | Hansen et al. |
| 2007/0168871 A1 | 7/2007 | Jenkins |
| 2007/0245339 A1 | 10/2007 | Bauman et al. |
| 2007/0284433 A1 | 12/2007 | Domenica et al. |
| 2007/0299697 A1 | 12/2007 | Friedlander et al. |
| 2008/0016155 A1 | 1/2008 | Khalatian |
| 2008/0091693 A1 | 4/2008 | Murthy |
| 2008/0109714 A1 | 5/2008 | Kumar et al. |
| 2008/0172607 A1 | 7/2008 | Baer |
| 2008/0186904 A1* | 8/2008 | Koyama ............ H04W 48/16 370/320 |
| 2008/0313132 A1 | 12/2008 | Hao et al. |
| 2009/0031401 A1 | 1/2009 | Cudich et al. |
| 2009/0089651 A1 | 4/2009 | Herberger et al. |
| 2009/0106178 A1 | 4/2009 | Chu |
| 2009/0112678 A1 | 4/2009 | Luzardo |
| 2009/0112745 A1 | 4/2009 | Stefanescu |
| 2009/0150868 A1 | 6/2009 | Chakra et al. |
| 2009/0187546 A1 | 7/2009 | Whyte et al. |
| 2009/0199106 A1 | 8/2009 | Jonsson et al. |
| 2009/0248757 A1 | 10/2009 | Havewala et al. |
| 2009/0249244 A1 | 10/2009 | Robinson et al. |
| 2009/0271343 A1 | 10/2009 | Vaiciulis et al. |
| 2009/0282068 A1 | 11/2009 | Shockro et al. |
| 2009/0307049 A1 | 12/2009 | Elliott et al. |
| 2009/0313463 A1 | 12/2009 | Pang et al. |
| 2009/0319891 A1 | 12/2009 | MacKinlay et al. |
| 2010/0057622 A1 | 3/2010 | Faith et al. |
| 2010/0070844 A1 | 3/2010 | Aymeloglu et al. |
| 2010/0098318 A1 | 4/2010 | Anderson |
| 2010/0223260 A1 | 9/2010 | Wu |
| 2010/0313239 A1 | 12/2010 | Chakra et al. |
| 2011/0093327 A1 | 4/2011 | Fordyce et al. |
| 2011/0099133 A1 | 4/2011 | Chang et al. |
| 2011/0173093 A1 | 7/2011 | Psota et al. |
| 2011/0208565 A1 | 8/2011 | Ross et al. |
| 2011/0225482 A1 | 9/2011 | Chan et al. |
| 2012/0022945 A1 | 1/2012 | Falkenborg et al. |
| 2012/0059853 A1 | 3/2012 | Jagota |
| 2012/0084117 A1 | 4/2012 | Tavares et al. |
| 2012/0188252 A1 | 7/2012 | Law |
| 2012/0215784 A1 | 8/2012 | King et al. |
| 2012/0226590 A1 | 9/2012 | Love et al. |
| 2013/0016106 A1 | 1/2013 | Yip et al. |
| 2013/0151453 A1 | 6/2013 | Bhanot et al. |
| 2013/0166348 A1 | 6/2013 | Scotto |
| 2013/0166480 A1 | 6/2013 | Popescu et al. |
| 2013/0263019 A1 | 10/2013 | Castellanos et al. |
| 2014/0129936 A1 | 5/2014 | Richards |
| 2014/0222793 A1 | 8/2014 | Sadkin et al. |
| 2014/0358829 A1 | 12/2014 | Hurwitz |
| 2015/0073954 A1 | 3/2015 | Braff |
| 2015/0106379 A1 | 4/2015 | Elliot et al. |
| 2015/0254220 A1 | 9/2015 | Burr et al. |

FOREIGN PATENT DOCUMENTS

| | | |
|---|---|---|
| WO | WO 01/25906 | 4/2001 |
| WO | WO 01/88750 | 11/2001 |
| WO | WO 2010/030914 | 3/2010 |
| WO | WO 2012/119008 | 9/2012 |

OTHER PUBLICATIONS

Abbey, Kristen, "Review of Google Docs," May 1, 2007, pp. 2.

Adams et al., "Worklets: A Service-Oriented Implementation of Dynamic Flexibility in Workflows," R. Meersman, Z. Tari et al. (Eds.): OTM 2006, LNCS, 4275, pp. 291-308, 2006.

Bluttman et al., "Excel Formulas and Functions for Dummies," 2005, Wiley Publishing, Inc., pp. 280, 284-286.

Chaudhuri et al., "An Overview of Business Intelligence Technology," Communications of the ACM, Aug. 2011, vol. 54, No. 8.

Conner, Nancy, "Google Apps: The Missing Manual," May 1, 2008, pp. 15.

Galliford, Miles, "SnagIt Versus Free Screen Capture Software: Critical Tools for Website Owners," http://www.subhub.com/articles/free-screen-capture-software, Mar. 27, 2008, pp. 11.

Gu et al., "Record Linkage: Current Practice and Future Directions," Jan. 15, 2004, pp. 32.

Hua et al., "A Multi-attribute Data Structure with Parallel Bloom Filters for Network Services" HiPC 2006, LNCS 4297, pp. 277-288, 2006.

JetScreenshot.com, "Share Screenshots via Internet in Seconds," http://web.archive.org/web/20130807164204/http://www.jetscreenshot.com/, Aug. 7, 2013, pp. 1.

Kwout, http://web.archive.org/web/20080905132448/http://www.kwout.com/ Sep. 5, 2008, pp. 2.

Microsoft Windows, "Microsoft Windows Version 2002 Print Out 2," 2002, pp. 1-6.

Microsoft, "Registering an Application to a URI Scheme," http://msdn.microsoft.com/en-us/library/aa767914.aspx, printed Apr. 4, 2009 in 4 pages.

Microsoft, "Using the Clipboard," http://msdn.microsoft.com/en-us/library/ms649016.aspx, printed Jun. 8, 2009 in 20 pages.

Nitro, "Trick: How to Capture a Screenshot As PDF, Annotate, Then Share It," http://blog.nitropdf.com/2008/03/04/trick-how-to-capture-a-screenshot-as-pdf-annotate-it-then-share/, Mar. 4, 2008, pp. 2.

Notice of Acceptance for Australian Patent Application No. 2013251186 dated Nov. 6, 2015.

(56) References Cited

OTHER PUBLICATIONS

Notice of Allowance for U.S. Appl. No. 14/265,637 dated Feb. 13, 2015.
Notice of Allowance for U.S. Appl. No. 14/552,336 dated Nov. 3, 2015.
Official Communication for Australian Patent Application No. 2013251186 dated Mar. 12, 2015.
Official Communication for Canadian Patent Application No. 2831660 dated Jun. 9, 2015.
Official Communication for European Patent Application No. 12181585.6 dated Sep. 4, 2015.
Official Communication for Great Britain Patent Application No. 1404486.1 dated Aug. 27, 2014.
Official Communication for Great Britain Patent Application No. 1404489.5 dated Aug. 27, 2014.
Official Communication for Great Britain Patent Application No. 1404499.4 dated Aug. 20, 2014.
Official Communication for Netherlands Patent Application No. 2011729 dated Aug. 13, 2015.
Official Communication for Netherlands Patent Application No. 2012438 dated Sep. 21, 2015.
Official Communication for New Zealand Patent Application No. 622473 dated Jun. 19, 2014.
Official Communication for New Zealand Patent Application No. 622473 dated Mar. 27, 2014.
Official Communication for New Zealand Patent Application No. 628161 dated Aug. 25, 2014.
Official Communication for U.S. Appl. No. 12/556,321 dated Jun. 6, 2012.
Official Communication for U.S. Appl. No. 12/556,321 dated Dec. 7, 2011.
Official Communication for U.S. Appl. No. 12/556,321 dated Jul. 7, 2015.
Official Communication for U.S. Appl. No. 13/669,274 dated Aug. 26, 2015.
Official Communication for U.S. Appl. No. 13/669,274 dated May 6, 2015.
Official Communication for U.S. Appl. No. 13/827,491 dated Dec. 1, 2014.
Official Communication for U.S. Appl. No. 13/827,491 dated Jun. 22, 2015.
Official Communication for U.S. Appl. No. 13/827,491 dated Oct. 9, 2015.
Official Communication for U.S. Appl. No. 14/265,637 dated Sep. 26, 2015.
Official Communication for U.S. Appl. No. 14/552,336 dated Jul. 20, 2015.
Official Communication for U.S. Appl. No. 14/571,098 dated Nov. 10, 2015.
Official Communication for U.S. Appl. No. 14/571,098 dated Mar. 11, 2015.
Official Communication for U.S. Appl. No. 14/571,098 dated Aug. 24, 2015.
Official Communication for U.S. Appl. No. 14/571,098 dated Aug. 5, 2015.
Official Communication for U.S. Appl. No. 14/800,447 dated Dec. 10, 2015.
Official Communication for U.S. Appl. No. 14/842,734 dated Nov. 19, 2015.
Online Tech Tips, "Clip2Net—Share files, folders and screenshots easily," http://www.online-tech-tips.com/free-software-downloads/share-files-folders-screenshots/, Apr. 2, 2008, pp. 5.
O'Reilly.com, http://oreilly.com/digitalmedia/2006/01/01/mac-os-x-screenshot-secrets.html published Jan. 1, 2006 in 10 pages.
Schroder, Stan, "15 Ways to Create Website Screenshots," http://mashable.com/2007/08/24/web-screenshots/, Aug. 24, 2007, pp. 2.
SnagIt, "SnagIt 8.1.0 Print Out 2," Software release date Jun. 15, 2006, pp. 1-3.
SnagIt, "SnagIt 8.1.0 Print Out," Software release date Jun. 15, 2006, pp. 6.
SnagIt, "SnagIt Online Help Guide," http://download.techsmith.com/snagit/docs/onlinehelp/enu/snagit_help.pdf, TechSmith Corp., Version 8.1, printed Feb. 7, 2007, pp. 284.
Wang et al., "Research on a Clustering Data De-Duplication Mechanism Based on Bloom Filter," IEEE 2010, 5 pages.
Warren, Christina, "TUAW Faceoff: Screenshot apps on the firing line," http://www.tuaw.com/2008/05/05/tuaw-faceoff-screenshot-apps-on-the-firing-line/, May 5, 2008, pp. 11.

\* cited by examiner

*Raw Data*
*(928 Characters)*

```
time,depth,octave,measure
12:42:07,100,0,2.16
12:42:07,100,1,5.4944
12:42:07,100,2,7.0717
12:42:07,200,0,6.0188
12:42:07,200,1,7.9749
12:42:07,200,2,9.775
12:42:07,300,0,5.302
12:42:07,300,1,4.80604
12:42:07,300,2,5.4
12:42:07,400,0,3.1267
12:42:07,400,1,4.2905
12:42:07,400,2,5.5894
12:42:07,500,0,8.85709
12:42:07,500,1,7.2633
12:42:07,500,2,9.0814
12:42:11,100,0,2.26
12:42:11,100,1,5.6964
12:42:11,100,2,6.8717
12:42:11,200,0,5.9188
12:42:11,200,1,8.0749
12:42:11,200,2,9.675
12:42:11,300,0,5.402
12:42:11,300,1,4.8
12:42:11,300,2,5.419
12:42:11,400,0,3.1367
12:42:11,400,1,4.5905
12:42:11,400,2,6.0894
12:42:11,500,0,8.75709
12:42:11,500,1,7.3633
12:42:11,500,2,9.1814
12:42:15,100,0,2.16
12:42:15,100,1,5.6864
12:42:15,100,2,6.3217
12:42:15,200,0,5.8488
12:42:15,200,1,7.1749
12:42:15,200,2,9.375
12:42:15,300,0,5.202
12:42:15,300,1,4.813
12:42:15,300,2,5.519
12:42:15,400,0,3.2367
12:42:15,400,1,4.6805
12:42:15,400,2,6.1494
12:42:15,500,0,9.05709
12:42:15,500,1,6.7833
12:42:15,500,2,8.2814
```

*Encoded Data*
*(667 characters in a format more suitable for further compression)*

| | $octave_1$ | $octave_2$ | $octave_3$ | $octave_4$ | ... | $octave_n$ |
|---|---|---|---|---|---|---|
| $depth_1$ | measure | measure | measure | measure | ... | measure |
| $depth_2$ | measure | measure | measure | measure | ... | measure |
| $depth_3$ | measure | measure | measure | measure | ... | measure |
| ... | | | | | | |
| $depth_m$ | measure | measure | measure | measure | ... | measure |

FIG. 2D

DISTRIBUTED ACOUSTIC SENSING DATA ANALYSIS SYSTEM

CROSS-REFERENCE TO RELATED APPLICATIONS

This application claims priority under 35 U.S.C. §119(e) to U.S. Provisional Application No. 62/089,076, entitled "DISTRIBUTED ACOUSTIC SENSING DATA ANALYSIS SYSTEM" and filed on Dec. 8, 2014, which is hereby incorporated by reference in its entirety.

TECHNICAL FIELD

The present disclosure relates to systems and techniques for querying databases or file systems and displaying queried data in an interactive user interface.

BACKGROUND

A system may comprise a large number of sensors that each collect measurements at regular intervals, and the measurements may be stored in a database. Thus, the database may store a large quantity of data. In some cases, the sensors may be located in rough terrain and the database may be located a sizeable distance away. It may become difficult, then, to transport the data from the sensors to the database.

Furthermore, once the data is stored in the database, a user may attempt to analyze a portion of the stored data. For example, the user may attempt to analyze a portion of the stored data that is associated with a specific time period. However, as the number of measurements increases over time, it can become very difficult for the user to identify the relevant data and perform the analysis.

SUMMARY

The systems, methods, and devices described herein each have several aspects, no single one of which is solely responsible for its desirable attributes. Without limiting the scope of this disclosure, several non-limiting features will now be discussed briefly.

Disclosed herein are various systems and methods for storing data in one or more databases or file systems and accessing the one or more databases or file systems in substantially real-time in order to determine information related to measured data points and provide the determined information to a user in an interactive user interface. For example, a first computing device may be configured to retrieve data measured by various sensors and compress the retrieved data so that the compressed data can be transported to and stored in one or more databases and/or file systems in an efficient manner and at a faster rate. The compression may include reducing the size of the sensor data by reorganizing the data to take advantage of similarities in time values between consecutive measured data instances. The compression may thus allow for faster transmission over a communication medium, which may be important given the possibly large distances between the sensors and the databases and/or file systems. Furthermore, by taking advantage of similarities in time values and other values in the sensor data, the first computing device may reorganize the sensor data in such a way that the sensor data is more easily parsed and analyzed, thereby reducing processor load.

The sensors may be located in sensor collection sites, such as oil wells, at various depths above and/or below an ocean floor. The one or more databases and/or file systems may be located on land and coupled to the sensors via a communication medium, such as a cable or a wireless connection. Each instance of data measured by a sensor may include a plurality of parameters. For example, each instance of measured data may include an amplitude of the measured data, a depth at which the data was measured, a time at which the data was measured, and a frequency range of the measured data (where each frequency range is referred to herein as an "octave").

A second computing device may retrieve the data stored in the one or more databases and/or file systems and generate an interactive user interface to display the data. While each instance of measured data may include a plurality of parameters, the second computing device may flatten the measured data such that information pertaining to each parameter can be displayed in a two-dimensional graph. The second computing device may further extract features from the stored data. For example, the sensors may measure acoustic signals, temperature, or other physical properties. In some cases, a variation in the measured amplitude of a physical property may indicate that an event has occurred or is about to occur during operation of the sensor collection site or any other structure in which the sensors are present. An indication of when and where the event was identified as well as a guess why the event occurred may be displayed in the interactive user interface.

The various systems described herein may reduce the time by which data can be transported over the communication medium from a sensor collection site, such as an oil well, to a data storage facility. For example, the compression techniques described herein may reduce the size of the data measured by the sensors, allowing for faster transmission over the communication medium and easier parsing and analysis of the sensor data. The various systems described herein may also enhance the user experience via the flattening techniques described herein. For example, while each instance of measured data may include a plurality of parameters, the user interfaces may be constructed such that all of the information associated with the parameters can be displayed using a two-dimensional graph. This may reduce the processing power necessary to display the measured data as complicated, graphics-intensive multi-dimensional graphs may not be necessary in order for the user to understand the measured data. Furthermore, the various systems described herein may reduce or prevent mechanical failures by identifying events that may be occurring using the measured data and notifying the user as such within the interactive user interface so that the user can take appropriate action.

One aspect of the disclosure provides a computing system configured to access one or more databases in substantially real-time in order to determine information related to measured data points and provide the determined information to a user in an interactive user interface. The computing system comprises one or more computer processors; a database storing compressed sensor values; and a computer readable storage medium. The computer readable storage medium may store program instructions configured for execution by the one or more computer processor in order to cause the computing system to: receive raw sensor values from a plurality of sensors located at various depths in a physical structure, wherein the raw sensor values correspond to a first number of values a second; aggregate the binned sensor values, wherein the aggregated binned sensor values comprise a plurality of rows, and wherein each row in the plurality of rows comprises a time value, a depth value, a frequency range, and an amplitude; traverse each row in the plurality of rows and place a representation of the time value in the respective row in a first row; traverse each row in the plurality of rows and place the depth value in the respective row in a second row; traverse each row in the plurality of rows and place the frequency range in the respective row in a third row; traverse each row in the plurality of rows and place the amplitude in the respective row in a fourth row; compress the first row, the second row, the third row, and the fourth row to generate compressed sensor values; access the compressed sensor values from the database; and generate user interface data for rendering the interactive user interface on a computing device, where the interactive user interface displays a representation of one or more of the compressed sensor values.

The computing system of the preceding paragraph can have any sub-combination of the following features: where the computer readable storage medium further stores program instructions that cause the computing system to for each time value in the first row after a first time value in the first row, identify a difference between a previous time value in the first row and the respective time value, where the representation of the respective time value comprises the identified difference; where the computer readable storage medium further stores program instructions that cause the computing system to: determine that each identified difference in the first row is a same value, and replace all of the identified differences in the first row with the determined same value; where the computer readable storage medium further stores program instructions that cause the computing system to zip the first row, the second row, the third row, and the fourth row to generate the compressed sensor values; where the interactive user interface includes a first container and a second container, where the first container includes a list of selectable frequency ranges and the second container includes a graph, where each frequency range in the list of selectable frequency ranges corresponds to an octave at which the plurality of sensors detect sound, where the graph identifies a plurality of time intervals and a plurality of depth ranges, where the time value associated with each compressed sensor value corresponds with a time interval in the plurality of time intervals, wherein the depth value associated with each compressed sensor value corresponds with a depth range in the plurality of depth ranges, and where the computer readable storage medium further stores program instructions that cause the computing system to: receive an identification of a selection by the user of a first frequency range within the list of selectable frequency ranges, and, for each time interval, frequency range, and depth range, determine a variation in amplitudes of compressed sensor values, based on the determined variations in amplitudes, determine one or more tiles having one or more characteristics indicating the determined variation in amplitudes, and display the one or more tiles in the graph; where each time indicates a single determined amplitude, and where the one or more tiles are shaded according to a value of the respective determined amplitude; where the computer readable storage medium further stores program instructions that cause the computing system to: receive an identification of a selection by the user of an outlier button, compute a mean and standard deviation of the determined variation in amplitudes associated with the first frequency range, and display the one or more tiles in the graph that have a characteristic indicating the determined variation in amplitudes exceeds two standard deviations from the computed mean; where the computer readable storage medium further stores program instructions that cause the computing system to: receive an identification of a selection by the user of an octave button, compute a mean and standard deviation of the determined variation in amplitudes associated with each frequency range in the list of selectable frequency ranges, and display the one or more tiles in the graph that have a characteristic indicating the determined variation in amplitudes exceeds two standard deviations from the computed mean over the first depth range and the first time period; where the one or more tiles are shaded according to a frequency range in the list of frequency ranges associated with the determined amplitudes that exceed two standard deviations from the computed mean; where the interactive user interface includes a third container that comprises a representation of equipment associated with the plurality of sensors, and where the representation of the equipment is located adjacent to the second container such that the representation corresponds with depth values in the first depth range; where the interactive user interface includes a third container that comprises a second graph representing sensor values measured by a first sensor over the first time period; where the computer readable storage medium further stores program instructions that cause the computing system to: receive an indication by the user of a selection in the second graph, where the selection corresponds with a first time in the first time period, and update the user interface data such that a first marker appears at a location of the selection in the second graph and a second marker appears at a location in the graph corresponding with the first time; where the computer readable storage medium further stores program instructions that cause the computing system to: receive an identification of a selection by the user of a point of interest button, compute a mean and standard deviation of the determined amplitudes associated with each frequency range in the list of selectable frequency ranges, determine a second depth range within the first depth range and a second time period within the first time period in which the determined amplitudes exceed the standard deviation for a threshold time period, retrieve event information from an event database for events that occurred during the second time period within the second depth range, and update the user interface data such that the interactive user interface includes a third container that comprises the event information and such that the graph includes a marker identifying the one or more tiles that are located within the second time period and the second depth range; where the computer readable storage medium further stores program instructions that cause the computing system to identify acoustic signatures based on the determined amplitudes that exceed the standard deviation for the threshold time period; where the computer readable storage medium further stores program instructions that cause the computing system to identify thermal signatures based on the determined amplitudes that exceed the standard deviation for the threshold time period; where the plurality of sensors comprises oil well sensors; and where the plurality of sensors extract at least one of acoustic data or temperature data from the physical apparatus.

Another aspect of the disclosure provides a computer-implemented method of accessing one or more databases in substantially real-time in order to determine information related to measured data points and providing the determined information to a user in an interactive user interface. The computer-implemented method comprises, as implemented by one or more computer systems comprising computer hardware and memory, the one or more computer systems configured with specific executable instructions, receiving raw sensor values from a plurality of sensors located at various depths in a physical structure, wherein the raw sensor values correspond to a first number of values a second; binning the received raw sensor values such that the binned raw sensor values correspond to a second number of values a second, wherein the second number is less than the first number; aggregating the binned sensor values, wherein the aggregated binned sensor values comprise a plurality of rows, and wherein each row in the plurality of rows comprises a time value, a depth value, a frequency range, and an amplitude; traversing each row in the plurality of rows and place a representation of the time value in the respective row in a first row; traversing each row in the plurality of rows and place the depth value in the respective row in a second row; traversing each row in the plurality of rows and place the frequency range in the respective row in a third row; traversing each row in the plurality of rows and place the amplitude in the respective row in a fourth row; compressing the first row, the second row, the third row, and the fourth row to generate compressed sensor values; accessing the compressed sensor values from the database; and generating user interface data for rendering the interactive user interface on a computing device, wherein the interactive user interface displays a representation of one or more of the compressed sensor values.

The computer-implemented method of the preceding paragraph can have any sub-combination of the following features: where the method further comprises for each time value in the first row after a first time value in the first row, identify a difference between a previous time value in the first row and the respective time value, where the representation of the respective time value comprises the identified difference; where the method further comprises determining that each identified difference in the first row is a same value, and replacing all of the identified differences in the first row with the determined same value; where compressing the first row, the second row, the third row, and the fourth row further comprises zipping the first row, the second row, the third row, and the fourth row to generate the compressed sensor values; where the interactive user interface includes a first container and a second container, where the first container includes a list of selectable frequency ranges and the second container includes a graph, where each frequency range in the list of selectable frequency ranges corresponds to an octave at which the plurality of sensors detect sound, where the graph identifies a plurality of time intervals and a plurality of depth ranges, where the time value associated with each compressed sensor value corresponds with a time interval in the plurality of time intervals, where the depth value associated with each compressed sensor value corresponds with a depth range in the plurality of depth ranges, and where the method further comprises: receiving an identification of a selection by the user of a first frequency range within the list of selectable frequency ranges, and, for each time interval, frequency range, and depth range, determining a variation in amplitudes of compressed sensor values, based on the determined variations in amplitudes, determining one or more tiles having one or more characteristics indicating the determined variation in amplitudes, and displaying the one or more tiles in the graph; where each time indicates a single determined amplitude, and where the one or more tiles are shaded according to a value of the respective determined amplitude; where the method further comprises receiving an identification of a selection by the user of an outlier button, computing a mean and standard deviation of the determined variation in amplitudes associated with the first frequency range, and displaying the one or more tiles in the graph that have a characteristic indicating the determined variation in amplitudes exceeds two standard deviations from the computed mean; where the method further comprises receiving an identification of a selection by the user of an octave button, computing a mean and standard deviation of the determined variation in amplitudes associated with each frequency range in the list of selectable frequency ranges, and displaying the one or more tiles in the graph that have a characteristic indicating the determined variation in amplitudes exceeds two standard deviations from the computed mean over the first depth range and the first time period; where the one or more tiles are shaded according to a frequency range in the list of frequency ranges associated with the determined amplitudes that exceed two standard deviations from the computed mean; where the plurality of sensors comprises oil well sensors; and where the plurality of sensors extract at least one of acoustic data or temperature data from the oil well platform.

BRIEF DESCRIPTION OF THE DRAWINGS

FIGS. 2A-2D illustrate exemplary processes for encoding and compressing data.

DETAILED DESCRIPTION OF SPECIFIC EMBODIMENTS

Overview

Figure 1:
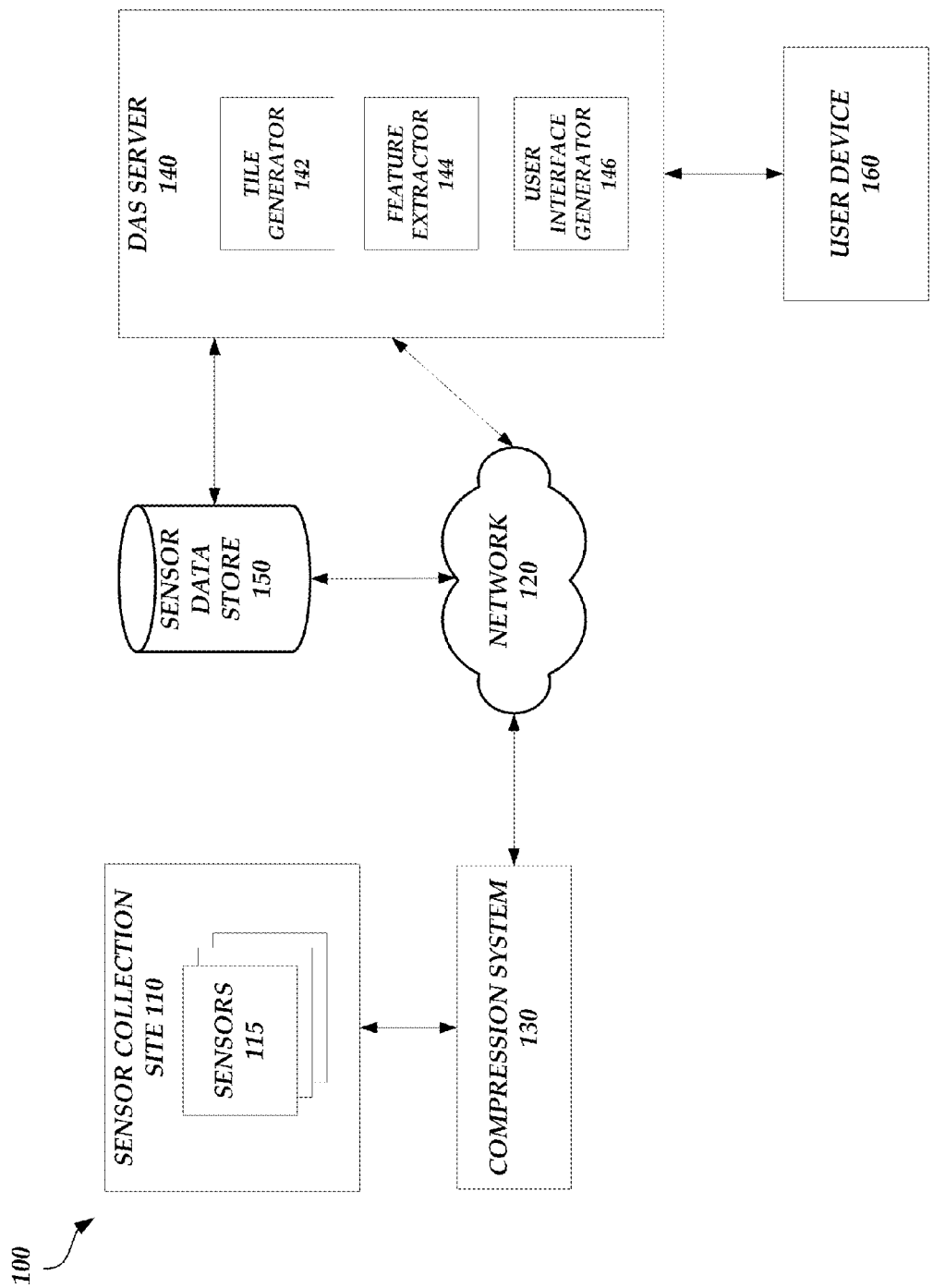
FIG. 1 illustrates a block diagram showing the various components of a distributed acoustic sensing data analysis system.

As described above, it may be difficult to transport the data measured by sensors located in a physical structure, such as a sensor collection site (e.g., an oil well), to a data storage facility that can store the measured data. This may be especially true when the sensor collection site is located in the ocean (e.g., above and/or below the ocean surface) and the data storage facility is on land. Furthermore, once the data is received and stored in the database and/or file system, it can become very difficult for the user to identify relevant data and perform an analysis when the database or file system includes a large amount of data. This may be especially true if the data includes a plurality of parameters that are not easily represented in two-dimensional graphs.

References herein to "databases" may refer to any type of data structure for storing and/or organizing data, including, but not limited to, relational databases (for example, Oracle database, mySQL database, and the like), spreadsheets, XML files, and text files, among others. The various terms "database," "data store," and "data source" may be used interchangeably in the present disclosure. A "file system" may control how data is stored and/or retrieved (for example, a disk file system like FAT, NTFS, optical discs, etc., a flash file system, a tape file system, a database file system, a transactional file system, a network file system, etc.). For simplicity, the disclosure is described herein with respect to databases. However, the systems and techniques disclosed herein may be implemented with file systems or a combination of databases and file systems.

Accordingly, disclosed herein are various systems and methods for storing data in one or more databases and accessing the one or more databases in substantially real-time in order to determine information related to measured data points and provide the determined information to a user in an interactive user interface. For example, a first computing device may be configured to retrieve data measured by various sensors and compress the retrieved data so that the compressed data can be transported to and stored in one or more databases in an efficient manner. The sensors may be located in sensor collection sites at various depths above and/or below an ocean surface. The sensors may be in the form of a cable, such as a fiber optic cable, to provide a distributed acoustic sensing (DAS) system. For example, a single fiber optic cable may become a sensing element that includes hundreds to thousands of sensors that can detect vibrations and/or other physical parameters. As pulsed light is transmitted through the fiber optic cable, the fiber optic cable may act as a distributed interferometer and an optoelectronic device coupled to the fiber optic cable (e.g., Optical Time Domain Reflectometer (OTDR) instrumentation) may monitor a backscatter noise signature (e.g., a coherent Rayleigh backscatter noise signature) in the fiber optic cable. The optoelectronic device may measure the intensity of the reflected light after the light pulse is transmitted and changes in the reflected intensity of successive light pulses from the same region in the fiber optic cable can be determined. The intensity of the reflected light may be dependent on a strain and/or a temperature at various locations around the fiber optic cable. The optoelectronic device may be able to detect variations in the strain and/or temperature simultaneously at all regions in the fiber optic cable. The fiber optic cable may be hundreds of meters long and the sensors may be spaced evenly (or unevenly) throughout (and thus may be associated with a particular depth level). In other embodiments, other types of sensors may be used.

The one or more databases may be located on land and coupled to the sensors via a communication medium, such as a cable or a wireless connection. Generally, any cables or other transmission lines that may couple the sensor collection site with the databases have very limited available bandwidth (e.g., 45 kb/s). Given the number of sensors in each fiber optic cable and the number of fiber optic cables that may be present in any given sensor collection site, the fiber optic cables may produce a very large quantity of data (e.g., each fiber optic cable may include about 5000 sensors, each sensor may generate about 10,000 measurements a second, and each measurement may be between about 4 and 8 bytes). However, the very limited bandwidth of the cables or other transmission lines makes the real-time transmission of the raw data nearly impossible (e.g., because the fiber optic cable may produce as much as 3,200,000 kb worth of data a second given the numbers provided above). In fact, instead of transmitting raw data over the communication medium, typically the raw data is saved locally at the sensor collection site and then shipped for storage in the databases (e.g., via helicopter, ship, truck, and/or other transportation means), which can take between 72 hours and several weeks. Thus, compression techniques are described herein to make the real-time transmission of the data over the existing communication medium possible.

Each instance of data measured by a sensor may include a plurality of parameters. For example, each instance of measured data may include an amplitude of the measured data, a depth at which the data was measured, a time at which the data was measured, and a frequency range of the measured data (which may correspond to an octave in a plurality of octaves).

A second computing device may retrieve the data stored in the one or more databases and generate an interactive user interface to display the data. While each instance of measured data may include a plurality of parameters, the second computing device may flatten the measured data such that information pertaining to each parameter can be displayed in a two-dimensional graph. For example, the second computing device may generate a plurality of user interface visualizations, such as "tiles" that are discussed herein as example, which are each associated with an octave. For each octave, the second computing device may identify depth values and time values for which amplitude data is available and generate tiles that each have a height (e.g., in pixels) that corresponds to a range of depth values and a width (e.g., in pixels) that corresponds to a range of time values. The tiles may be two-dimensional rectangles, circles, or other such shapes. Each tile may be shaded or color-coded to indicate a degree of variation in the amplitude within the range of depth values and the range of time values. For example, a tile may be shaded a lighter color if there is an amplitude spike within the range of depth values and the range of time values and a darker color if the amplitude values are relatively consistent within the range of depth values and the range of time values. The second computing device may generate a separate two-dimensional graph for each octave in the plurality of octaves, with a first axis representing depth values and a second axis representing time values. Each tile may then be placed in the two-dimensional graph that corresponds with the respective tile's octave at a location that matches or closely matches the respective tile's depth value range and time value range.

The second computing device may further extract features from the stored data. For example, the sensors may detect acoustic signals, measure temperature (or changes in temperature), or detect or measure other physical properties. In some cases, a variation in the measured amplitude of a physical property may indicate that an event has occurred or is about to occur during operation of the sensor collection site or any other structure in which the sensors are present. In the case of an oil well, an event may include sand entering a well during the drilling process, a structural vibration in a component of the oil well, a failure of a component of the oil well, and/or the like. Each event may correspond with an event signature (or "fingerprint") that represents a variation in amplitude over time and/or depth, based on data from one or more sensors from one or more occurrences of the event. Such event signatures may be determined by the second computing system based on identification of one or more occurrences of a particular event and extraction of measurement data from sensors near the event at the event time.

Event signatures may be developed for anomalies such as sand in a pipe, structure integrity issues, such as cracks or bends, or any other aspect of the well that can be measured by data from one or more sensors. Thus, the second computing device may compare event signatures with the stored data and/or the generated tiles to extract one or more features (e.g., to identify one or more events). An indication of when and where the event was identified as well as an indication (based on varying degrees of certainty) as to why the event occurred may be displayed in the interactive user interface.

The interactive user interface may further include an indication of octaves in the plurality of octaves for which data is available. A user may select any of the octaves to view a corresponding two-dimensional graph for that octave. The interactive user interface may further allow a user to view a select number of tiles. For example, the user may be able to view the tiles that represent variations in amplitude that exceed a threshold value (e.g., a standard deviation from the mean).

In some embodiments, the interactive user interface provides controls to allow a user to view additional data concurrently with the two-dimensional graphs described herein. For example, the user can concurrently view the two dimensional graph associated with a first sensor collection site and a two-dimensional graph associated with a second sensor collection site. As another example, the user can concurrently view the two-dimensional graph and a representation of the equipment or components of the sensor collection site that are present at the depths indicated by the two-dimensional graph. As another example, the user can concurrently view the two-dimensional graph and one or more time-series or scatterplots that each display data measured by a sensor. The user interface may be interactive in that a user may manipulate one time-series or scatterplot graph, which causes an identical or nearly identical manipulation of another time-series or scatterplot graph or the two-dimensional graph in real-time. The manipulations may occur even if the displayed graphs include data across different time ranges. The user interface may also be interactive in that a user may select a portion of any of the graphs (e.g., data across a certain time period) to view tangential data related to the selection (e.g., events that occurred during a time period represented by the selection).

As described above, the various systems described herein may reduce the time by which data can be transported over the communication medium from a sensor collection site, such as an oil well, to a data storage facility and make the real-time transmission of data from the sensor collection site to the data storage facility (and ultimately to a user device) possible. For example, the compression techniques described herein may reduce the size of the data measured by the sensors by a magnitude of 3 or more. The size of the sensor data may be reduced by reorganizing the data to take advantage of similarities in time values between consecutive measured data instances, as described in greater detail below with respect to FIGS. 2A-2D. The compression techniques described herein may thus allow for faster transmission over the communication medium, which may be important given the possibly large distances between the sensor collection sites and the data storage facility. Furthermore, by taking advantage of similarities in time values and other values in the sensor data to reduce the size of the data, the compression techniques may reorganize the sensor data in such a way that the sensor data is more easily parsed and analyzed, thereby reducing processor load. Moreover, the reduction in the size of the data makes the real-time transmission of the data from the sensor collection site to the data storage facility to a display visible by a user possible.

The various systems described herein may also enhance the user experience via the flattening techniques described herein. For example, while each instance of measured data may include a plurality of parameters, the user interfaces may be constructed such that all of the information associated with the parameters can be displayed using a two-dimensional graph. This may reduce the processing power necessary to display the measured data as complicated, graphics-intensive multi-dimensional graphs may not be necessary in order for the user to understand the measured data. Furthermore, the various systems described herein may reduce or prevent mechanical failures by identifying events that may be occurring using the measured data and notifying the user as such within the interactive user interface so that the user can take appropriate action.

The disclosure provided herein is described with respect to DAS data and a system that compresses DAS data, displays DAS data, and extracts features from DAS data, but this is not meant to be limiting. For example, a device or cable, such as a fiber optic cable, may be configured to provide a distributed thermal sensing (DTS) system. The systems and techniques disclosed herein can be used to compress DTS data, display DTS data, extract features from DTS data, and/or further analyze DTS data in any way as described herein with respect to DAS data.

Exemplary System Overview

FIG. 1 illustrates a block diagram showing the various components of a distributed acoustic sensing (DAS) data analysis system 100. As illustrated in FIG. 1, the DAS data analysis system 100 may include a sensor collection site 110 (e.g., an oil well), a compression system 130, a DAS server 140, a sensor data store 150, and a user device 160. In an embodiment, the compression system 130 and the sensor data store 150 communicate via a network 120. In some embodiments, the compression system 130 further communicates with the DAS server 140 via the network 120. In other embodiments, the functionality of the compression system 130 and the DAS server 140 may be combined into a single computing system, such as a server or series of servers. Similarly, the functionality is disclosed with reference to these components may be distributed to other computing devices and/or partially performed by multiple computing devices.

The sensor collection site 110 may be a structure that comprises various components and equipment and located in the ocean (e.g., a portion of the sensor collection site 110 may be situated above the ocean surface and a portion of the sensor collection site 110 may be situated below the ocean surface). The sensor collection site 110 may further include a plurality of sensors 115 that detect or measure physical properties, such as acoustic signals, temperature (or changes in temperature), and/or the like. The plurality of sensors 115 may be embedded in a cable, such as a fiber optic cable, that traverses across various depths above and/or below the ocean floor, such as in oil wells that extend into the ocean floor. In other embodiments, the sensor collection site 110 may be located on land and the plurality of sensors 115 may be located above and/or below ground. As an example, the sensors 115 may comprise a DAS system.

The compression system 130 may be coupled to the sensors 115 of the sensor collection site 110 and may provide an interface between the sensors 115 and the network 120. In an embodiment, the compression system 130 receives data measured by the sensors 115 and compresses the data. The compression system 130 then transmits the compressed data over the network 120 for storage in the sensor data store 150. As an example, the sensor data store 150 may be implemented as the time-series data store described in U.S. Provisional Application No. 62/171,875, titled "TIME-SERIES DATA STORAGE AND PROCESSING DATABASE SYSTEM" and filed on Jun. 5, 2015, the contents of which is hereby incorporated herein by reference in its entirety. In some embodiments, the compression system 130 may directly transmit the compressed data to the DAS server 140. The compression techniques performed by the compression system 130 are described in more detail below with respect to FIGS. 2A-2D.

The DAS server 140 may include various modules. For example, the DAS server 140 may include a tile generator 142, a feature extractor 144, and a user interface generator 146. In an embodiment, the tile generator 142, the feature extractor 144, and the user interface generator 146 are each implemented as executable code modules that are stored in the memory of, and executed by the processor(s) of, the DAS server 140. The tile generator 142, the feature extractor 144, and the user interface generator 146 may also be implemented partly or wholly in application-specific hardware. The tile generator 142 may generate tiles using the compressed data stored in the sensor data store 150 and/or received directly from the compression system 130. For example, as described above, each instance of the measured, compressed data may include a plurality of parameters. The parameters may include an amplitude of the measured data, a depth at which the data was measured, a time at which the data was measured, and a frequency range of the measured data (where the frequency range corresponds to an octave in a plurality of octaves). Each tile generated by the tile generator 142 may be associated with an octave. For each octave, the tile generator 142 may identify depth values and time values for which amplitude data is available and generate tiles that have respective heights corresponding to a range of depth values and widths that corresponds to a range of time values.

The tile generator 142 may determine characteristics of tiles and/or generate user interface code configured for display of tiles. Characteristics of tiles that may be determined by the tile generator 142 may include a shade or color-coding of the tiles to indicate a degree of variation in the amplitude within the range of depth values and the range of time values. For example, a tile may be shaded a lighter color if there is an amplitude spike within the range of depth values and the range of time values and a darker color if the amplitude values are relatively consistent within the range of depth values and the range of time values.

The user interface generator 146 may generate an interactive user interface that displays the generated tiles. For example, the user interface generator 146 may generate a plurality of two-dimensional graphs that include depth values on one axis and time values on the other axis. Each two-dimensional graph may be associated with an octave. The user interface generator 146 may include in the interactive user interface the two-dimensional graph that corresponds with an octave selected by a user. The user interface generator 146 may automatically select tiles associated with a selected octave and include those selected tiles in association with the two-dimensional graph. In some embodiments, the generated tiles are placed in the graph at a location that corresponds with the respective tile's depth value range and time value range.

The user interface generator 146 may be configured to include additional features in the interactive user interface. For example, the interactive user interface may allow the user to scroll through the displayed tiles and/or change a zoom level of the view to view information at different depths and/or times. In an embodiment, changing the zoom level of the view causes the tile generator 142 to generate new tiles to correspond with the modified depth and/or time scales. In some cases, zooming out may mask some amplitude spikes because other amplitude values within the new zoomed out depth and/or time range may average out the spikes. However, the tile generator 142 may color or shade the tile to indicate that the spikes occurred even if the spikes would normally be averaged out. Thus, at a high zoom level (e.g., 100%), a tile may be shaded to show a large variation in amplitude. At a lower zoom level (e.g., 50%), a tile that covers the location where the large variation in amplitude occurred may also be shaded to show the large variation in amplitude even if the amplitudes are relatively consistent in other areas covered by the tile and would normally subsume the large variation.

The interactive user interface may also allow the user to view a subset of the tiles, such as the tiles that correspond with a variation in amplitude that exceeds a threshold value (e.g., a standard deviation from the mean absolute amplitude value, a standard deviation from the mean variation in amplitude, etc.). The user interface generator 146 may compute the mean and standard deviation values (using the data stored in the sensor data store 150) in order to determine which tiles to display. The interactive user interface may also display events that are identified to have occurred or that may occur based on an analysis of the compressed data, as described in greater detail below. Additional features of the interactive user interface provided by the user interface generator 146 are described in greater detail below with respect to FIGS. 2A-8.

In an embodiment, the feature extractor 144 extracts features present in the compressed data stored in the sensor data store 150 and/or received directly from the compression system 130 based on an analysis of the compressed data. Features may include events that have occurred and/or events that may occur in the future during operation of the sensor collection site 110 or any other structure in which the sensors 115 are present. For example, in the case of an oil well, events may include sand entering a well during the drilling process, a structural vibration in a component or a piece of equipment of the oil well, a failure of a component or a piece of equipment of the oil well, and/or the like.

The feature extractor 144 may identify the events based on a comparison of the compressed data or the generated tiles with a set of event signatures. An event signature may represent a variation in amplitude over time and/or depth and correspond with a particular event. As described above, a variation in the measured amplitude of a physical property may indicate that an event has occurred or is about to occur during operation of the sensor collection site 110 or any other structure in which the sensors 115 are present. This may be especially true if a loud noise or a large change in temperature is detected (e.g., a large variation in the measured amplitude). For example, a noise that occurs for a set period of time at a set depth may indicate that a crack in equipment occurred. As another example, a rate of cooling (or warming) may indicate that equipment is in danger of cracking. In the case of a cooling or warming gradient, the feature extractor 144 or another component (not shown) may take into account normal geothermal cooling or warming gradients (e.g., caused by the sun or lack of sun) in identifying the rate of cooling or warming. Thus, the feature extractor 144 may compare the set of event signatures with the compressed data and/or the generated tiles and identify any close or exact matches. For example, a close match may be a period of time or a range of depths in which a variation in amplitudes is within a threshold value of the variation in amplitudes of an event signature. The feature extractor 144 may retrieve the event signatures from a data store, such as the sensor data store 150, in order to perform the comparison. Any close or exact matches may be forwarded to the user interface generator 146 such that an indication of when and where the event was identified as well as information regarding why the event occurred or may occur can be displayed in the interactive user interface.

The DAS server 140 may be implemented as a special-purpose computer system having logical elements. In an embodiment, the logical elements may comprise program instructions recorded on one or more machine-readable storage media. Alternatively, the logical elements may be implemented in hardware, firmware, or a combination thereof. In one embodiment, the DAS server 140 may be implemented in a Java Virtual Machine (JVM) that is executing in a distributed or non-distributed computer system. In other embodiments, the DAS server 140 may be implemented as a combination of programming instructions written in any programming language (e.g. C++, Visual Basic, Python, etc.) and hardware components (e.g., memory, CPU time) that have been allocated for executing the program instructions.

A user may use the user device 160 to view and interact with the interactive user interface generated by the user interface generator 146. For example, the user device 160 may be in communication with the DAS server 140 via a network (not shown). The user device 160 can include a wide variety of computing devices, including personal computing devices, terminal computing devices, laptop computing devices, tablet computing devices, electronic reader devices, mobile devices (e.g., mobile phones, media players, handheld gaming devices, etc.), wearable devices with network access and program execution capabilities (e.g., "smart watches" or "smart eyewear"), wireless devices, set-top boxes, gaming consoles, entertainment systems, televisions with network access and program execution capabilities (e.g., "smart TVs"), and various other electronic devices and appliances. The user devices 160 may execute a browser application to communicate with the DAS server 140.

In an embodiment, the network 120 includes any communications network, such as the Internet. The network 120 may be a wired network, a wireless network, or a combination of the two. For example, network 120 may be a local area network (LAN) and/or a wireless area network (WAN). The network 120 may include cables and/or other equipment that allow the transport of data from underwater locations to above-ground locations and/or vice-versa. For example, the network 120 may include one or more firewalls (e.g., a firewall that provides an interface between the compression system 130 and the other components of the network 120 and/or a firewall that provides an interface between the other components of the network 120 and the DAS server 140 and/or the sensor data store 150) and/or an endpoint server, such as a secure HTTP endpoint system.

Example Data Encoding and Compression

FIGS. 2A-2D illustrate exemplary processes for encoding and compressing data. In some embodiments, the sensors 115 may collect thousands of data points each second (e.g., 4000 data points a second). In order to reduce the amount of data by a magnitude of 3 or more (e.g., such that there are 4 data points a second), the sensors 115 and/or the compression system 130 may bin the data. For example, the compression system 130 (or the sensors 115) may bin the data by taking the measurements collected by a sensor 115 over a period of time (e.g., a quarter of a second) and performing a Fourier transform (or any other technique used to convert from the time domain to the frequency domain) on the measurements. Performing the Fourier transform may result in a set of amplitudes across a range of frequencies. The compression system 130 (or the sensors 115) may divide the range of frequencies into any number of sub-ranges (e.g., octaves), where the octaves can be determined in any way and can be of varying frequency range (e.g., the octaves can be determined exponentially such that a first octave has a shorter frequency range than a second octave, the second octave has a shorter frequency range than a third octave, and so on). For each octave, the compression system 130 (or the sensors 115) may determine an average of the amplitudes in the octave (or a maximum of the amplitudes, a minimum of the amplitudes, or the application of another such mathematical function to the amplitudes) and assign the average amplitude to the respective octave. Thus, for each period of time, the compression system 130 (or the sensors 115) may reduce the amount of data such that a single, average amplitude value (or a single maximum amplitude value, a single minimum amplitude value, or a single amplitude value based on the application of another such mathematical function) is assigned to each octave. The compression system 130 (or the sensors 115) may repeat this process for each sensor 115.

Figure 2A:
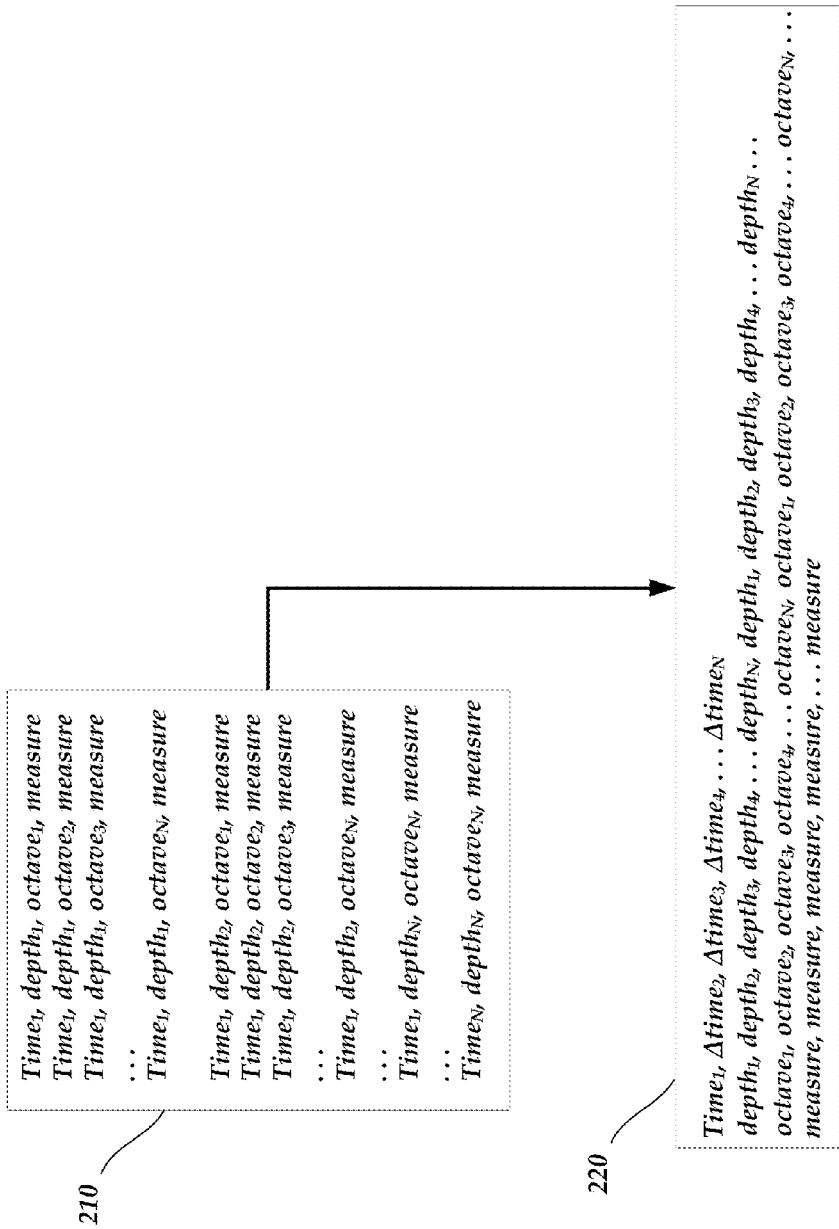
Figure 2B:
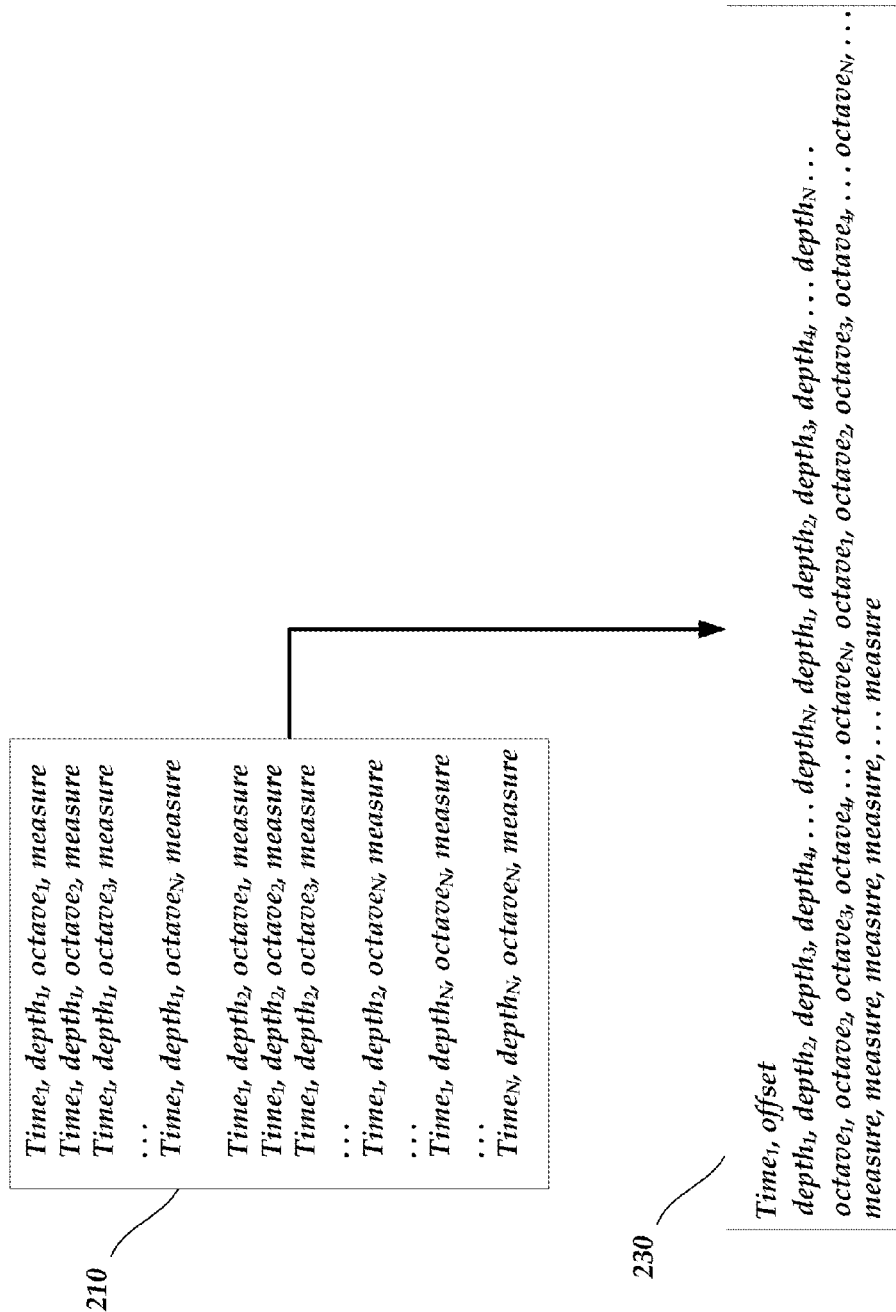

The binned, raw data is depicted in box 210 of FIG. 2A. As illustrated in box 210, each row of data includes a time value, a depth value (e.g., which may be determined based on the sensor 115 from which the measure value originates), an octave value, and a measure value (e.g., an amplitude). The time value may be represented in hours, minutes, and seconds. The depth value may be measured in meters or feet. The octave value may be an integer value ranging from 0 to N, where 0 is the lowest octave that corresponds with a lowest frequency range. The measure values may be values that are dependent on the physical property that is being measured. The data may be represented in a numerical format, a binary format, or any similar format. The commas and new lines present in the box 210 are for illustrative purposes only and may not be included in the actual binned, raw data. In some embodiments, if the binned, raw data is transported to the sensor data store 150 for storage without encoding or compression, the file storing the binned, raw data can be several megabytes in size (e.g., 2 MB).

In an embodiment, the compression system 130 encodes that raw data to reduce the size of the data and to also put the compressed data in a format that is better compressible by a compression algorithms that can take advantage of similarities between measured values. For example, time values may be similar between consecutive measured data instances. However, as currently constructed, three different values (depth, octave, and measure) separate consecutive time values. Likewise, depth and octave values may be similar between consecutive measured data instances. However, again, three different values separate consecutive instances of these values. The compression system 130 reorganizes the binned, raw data such that consecutive time values are placed adjacent to each other. For example, the compression system 130 traverses the binned, raw data row by row and places each time value (in the order observed) in a single row. Furthermore, the compression system 130 identifies a difference between consecutive time values, and replaces each time value after the first time value (e.g., $time_1$) with a delta time value that represents the difference between the previous time value and the current time value.

Thus, if measurements are received at regular intervals, the first time value may be followed by the same difference values. Alternatively, the compression system 130 identifies a difference between a current time value and the first time value and replaces the current time value with an offset that represents the identified difference. Thus, the first time value may be followed by successively larger offset values. Therefore, the compression system 130 reduces the amount of data by removing unnecessary portions of the time values.

In one embodiment, the compression system 130 may traverse the binned, raw data row by row and places each depth value (in the order observed) in a single row after the time value row. Thus, the depth values may descend (or ascend) and then repeat the descent (or ascent) one or more times. Likewise, the compression system 130 may traverse the binned, raw data row by and row and places each octave value (in the order observed) in a single row after the depth value row. Thus, the octave values may descend (or ascend) and then repeat the descent (or ascent) one or more times. Finally, the compression system 130 may place the measure values in a single row after the octave value row in the order observed during the row traversal. An example of the reorganized data as produced by the compression system 130 is provided in box 220.

Once the compression system 130 has encoded the binned, raw data, the compression system 130 may apply a further compression algorithm to the reorganized data. For example, the compression system 130 may zip the data (e.g., using gzip). In some embodiments, the file storing the compressed data can be an order of magnitude smaller than a file storing the binned, raw data (e.g., 0.2 MB) or several orders of magnitude smaller than a file storing the binned, raw data (e.g., 1-3% of the size of the file storing the binned, raw data).

In an embodiment, the compression system 130 further reduces the file size of the encoded and compressed data. For example, data may be collected at regular intervals. Instead of including delta time values or offsets in the reorganized and compressed data, the compression system 130 may include the first time value and a single offset value, as illustrated in the first line in box 230 of FIG. 2B, wherein a single "offset" value is provided to indicate the periodicity of obtaining samples, such that no further time information is necessary. Thus, even less data may be transported by the compression system 130 for storage in the sensor data store 150.

Figure 2C:
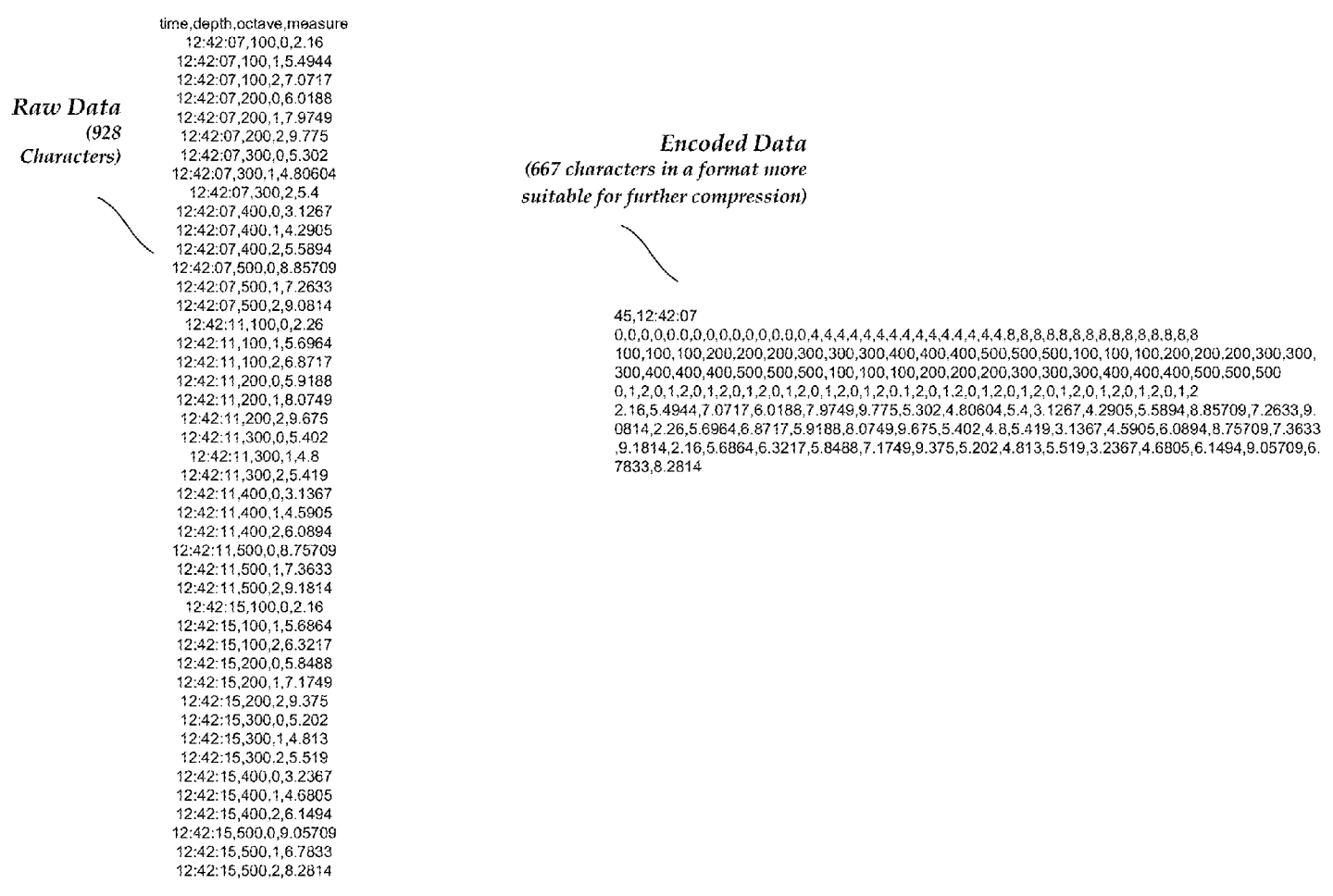

FIG. 2C illustrates example raw data and encoded data that may be generated by the compression system 130. In this example, the raw data includes, for each sensor measurement, a time, depth, octave, and measurement value. The encoded data includes, however, a quantity of measurements (45 in this example), a single time indicator (12:42:07 in this example), and then a series of time offsets, followed by a series of depths (which may be offsets in other examples), a series of octaves (again, which may be offsets in other examples), and a series of measurements (which may be offsets rather than raw data in other embodiments). With the data encoded in this manner, further compression may be applied to the encoded data to reduce the size of the data significantly.

In further embodiments, the compression system 130 further packages the encoded data for transmission over the communication medium such that the real-time viewing of the data by a user using the user device 160 is possible (e.g., where the term "real-time" refers to a latency of about 5 seconds to about 10 seconds from when the data is measured by a sensor 115 to when the data is received by the DAS server 140 or the user device 160). For example, the compression system 130 may create a file (e.g., a Log ASCII Standard (LAS) file, which is a standard file format that stores oil well log information, as depicted in FIG. 2D and as described below) in which a time value makes up the name of the file, and the depth, octave, and measurement values associated with the time value are included in the file. The compression system 130 may optionally include a parameter with the file that indicates a sensor collection site (e.g., oil well) from which the data included in the file originates. Thus, the compression system 130 can transmit multiple files that each correspond to a same time (or a different time) and that each originate from a different sensor collection site simultaneously or nearly simultaneously to allow for real-time viewing of the data.

FIG. 2D illustrates an example of a file 240 created by the compression system 130. For example, the file 240 may be a LAS file. As illustrated in FIG. 2D, the file 240 organizes the data by depth and octave. Column 242 (which may or may not be included in the file 240) indicates a depth value that each row in the file 240 corresponds to and row 244 (which may or may not be included in the file 240) indicates an octave value that each column in the file 240 corresponds to. The measure values are included in each row and/or column based on the depth value at which the measure value is derived (e.g., the depth value associated with the sensor 115 from which the measure value is derived) and the octave that corresponds to a frequency range associated with the measure value (e.g., as determined based on the Fourier transform).

The file 240 may include data for all depth levels associated with the various sensors 115. Alternatively, a user, via the user device 160, may indicate a subset of depth levels that are of interest, where the compression system 130 receives the indication via the network 120. Thus, the compression system 130 may generate the file 240 such that only measure values for the subset of depth levels are included in the file 240.

As described above, the compression system 130 may provide several benefits. Because the encoded and compressed data may have a file size that is significantly smaller than a file size of the raw data, the encoded and compressed data may be transmitted from the compression system 130 to the DAS server 140 and/or the sensor data store 150 over the network at a much faster rate. Moreover, the reduced file size allows for the real-time streaming of the data even with a limited bandwidth communication medium. Furthermore, the DAS server 140 may use a reduced processor load to parse and analyze the encoded and compressed data for display.

Figure 3A:
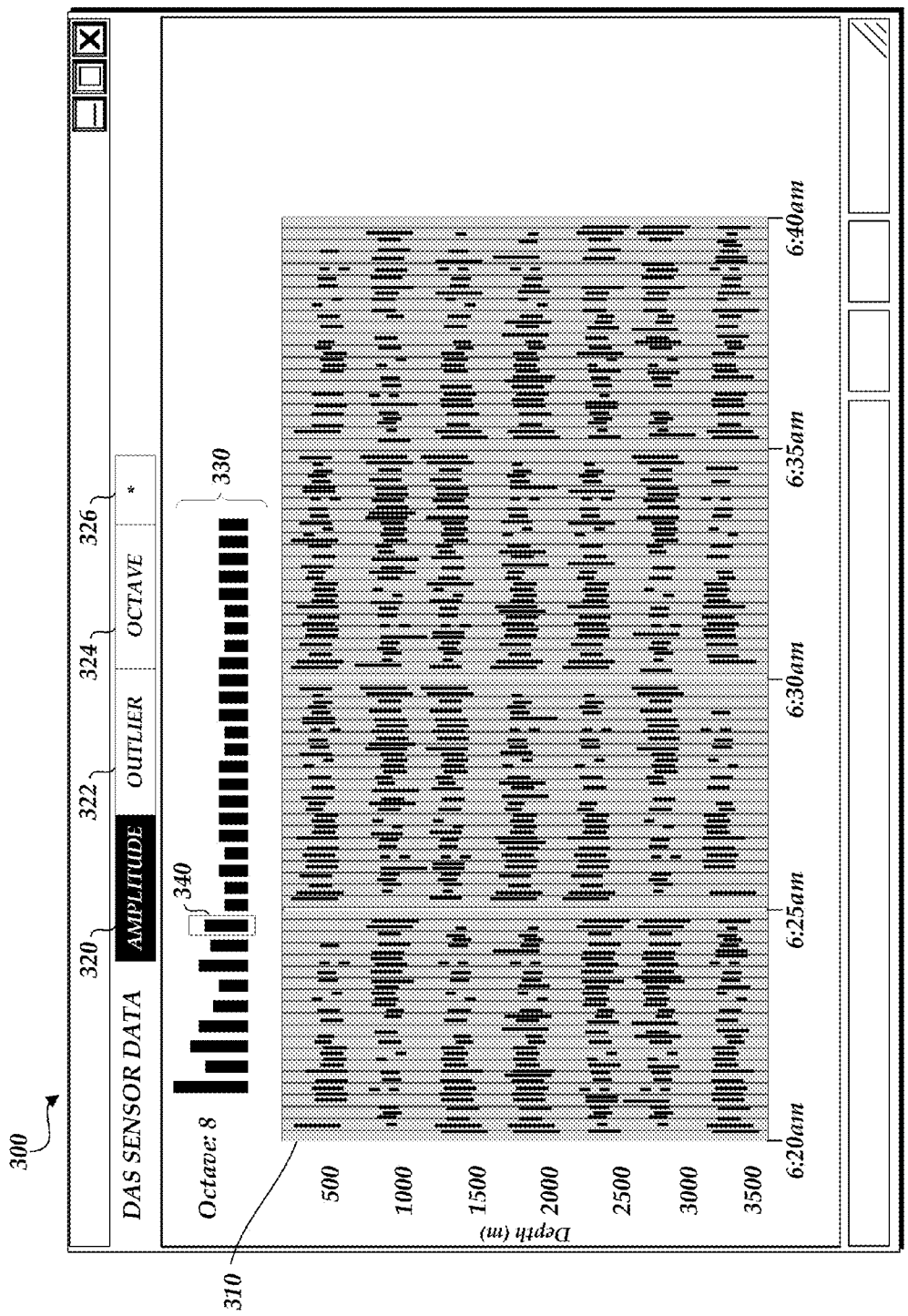
FIGS. 3A-3C illustrate a user interface displaying a graph depicting flattened acoustic data.
Figure 3B:
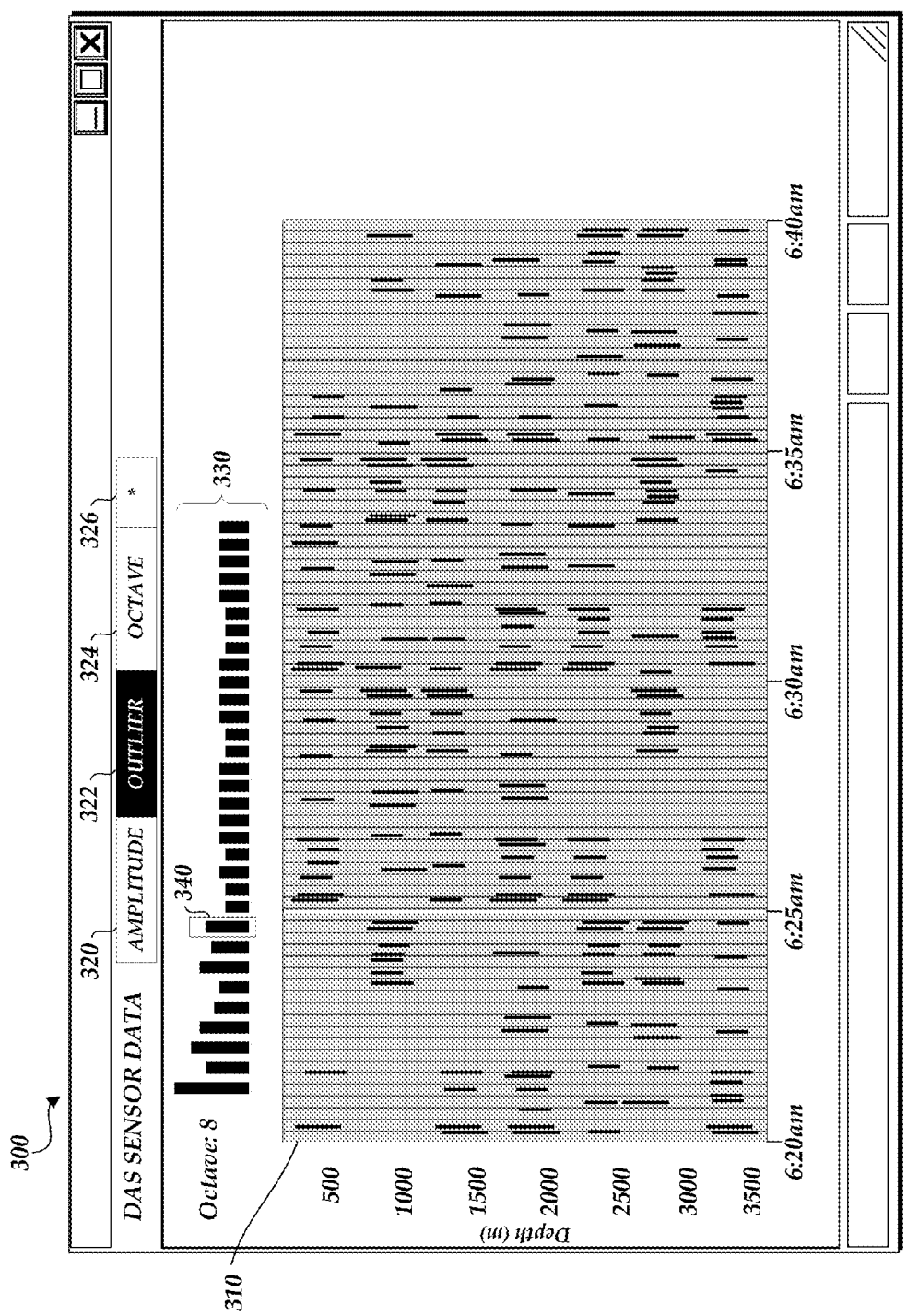
Figure 3C:
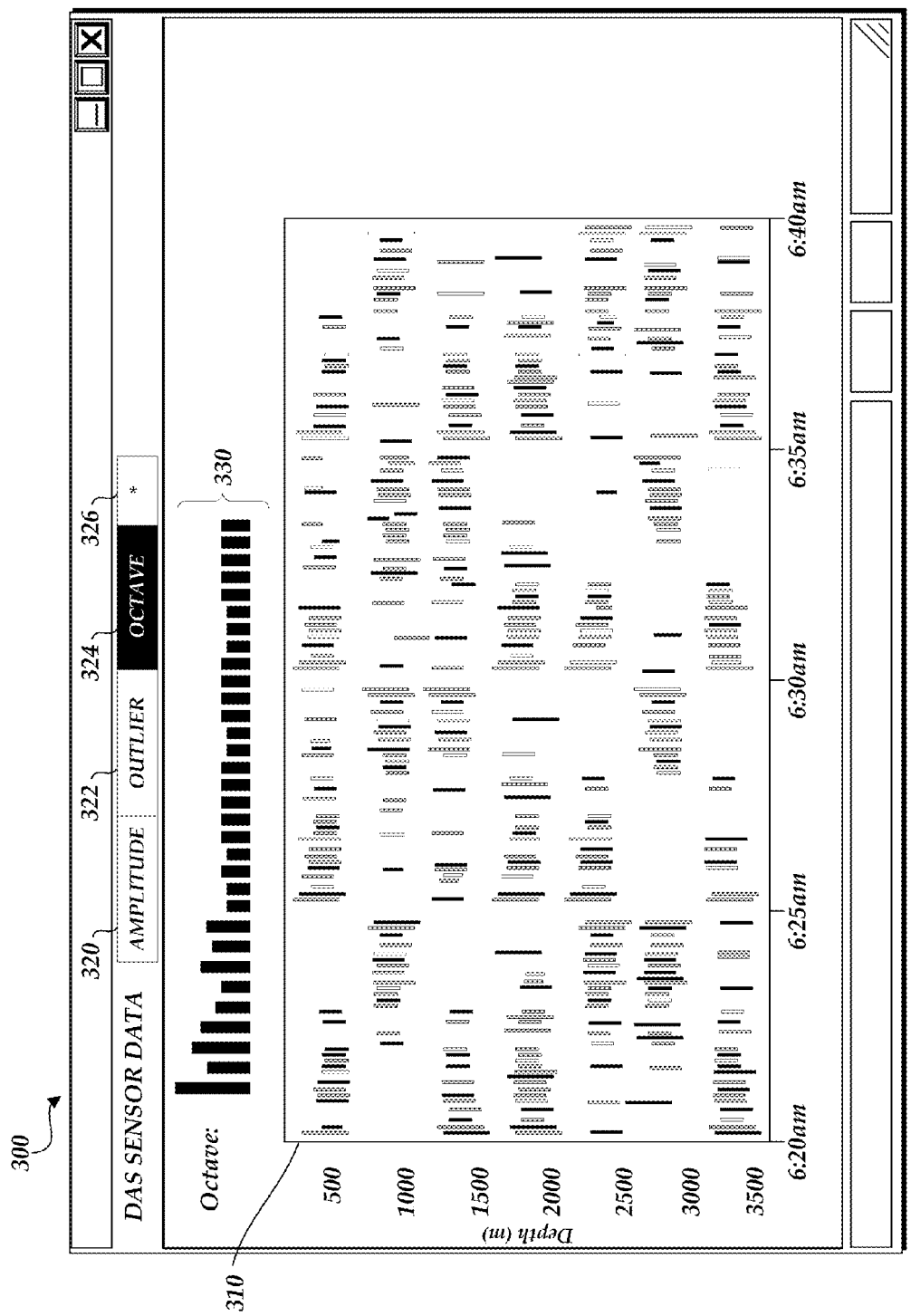

Examples of Manipulating Graphs Depicting Flattened Acoustic or Temperature Data in an Interactive User Interface FIGS. 3A-3C illustrate a user interface 300 displaying a graph 310 depicting flattened acoustic data. While the description provided herein primarily describes the embodiments with respect to acoustic data, this is not meant to be limiting. The techniques and embodiments described herein may apply to temperature data or any other physical property data that may be measured by the sensors 115. As illustrated in FIG. 3A, the user interface 300 includes the graph 310, amplitude button 320, outlier button 322, octave button 324, point of interest button 326, and a list of selectable octaves 330. In an embodiment, a user has selected the amplitude button 320 and has selected the octave 8 in the list of selectable octaves 330, as indicated by the box 340. The amplitude button 320, when selected, causes the graph 310 to display tiles representing amplitude variations for the selected octave. Thus, the graph 310 includes tiles that correspond with octave 8. The dark rectangles in the graph 310 may represent tiles that correspond with large amplitude variations. The remaining, lighter shaded portions of the graph 310 may represent tiles that correspond with small amplitude variations. Furthermore, the height of each octave representation in the list of selectable octaves 330 may correspond with the number of dark tiles associated with the octave. For example, a larger height may indicate that a larger number of depths and/or times within the selected octave have high amplitude variations and, thus, there are a larger quantity of dark tiles that are associated with the octave.

While the tiles are described herein and illustrated as being included in two-dimensional graphs, this is not meant to be limiting. The tiles may also be included in three-dimensional graphs. In such a case, the depth, width, and/or height of the tile may indicate a degree of amplitude variation in addition to or in place of the coloring or shading.

As illustrated in FIG. 3B, the user has now selected the outlier button 322. The outlier button 322, when selected, causes the graph 310 to display only those tiles associated with the selected octave that represent variations in amplitudes that exceed a threshold value. For example, the threshold value may be a standard deviation from the mean variation in amplitude, a standard deviation from the mean absolute amplitude value, two standard deviations from the mean variation in amplitude, two standard deviations from the mean absolute amplitude value, and/or the like. Thus, the graph 310 displays dark tiles at associated depths within octave 8 that include variations in amplitude that exceed the threshold value.

As illustrated in FIG. 3C, the user has now selected the octave button 324. The octave button 324, when selected, causes the graph 310 to display all tiles that represent variations in amplitudes that exceed the threshold value, regardless of octave. Thus, as shown in FIG. 3C, the selection of octave 8 has been removed and information across all octaves is displayed. The octaves may be associated with a different color or shading such that the tiles are colored or shaded according to the color or shading associated with their respective octave. For example, tiles associated with octave 1 may be colored red, while tiles associated with octave 2 are colored blue, tiles associated with octave 3 are colored green, etc. In this way, anomalies (e.g., large variations in amplitude) across all frequencies and steps may be visualized in a single user interface.

Figure 4A:
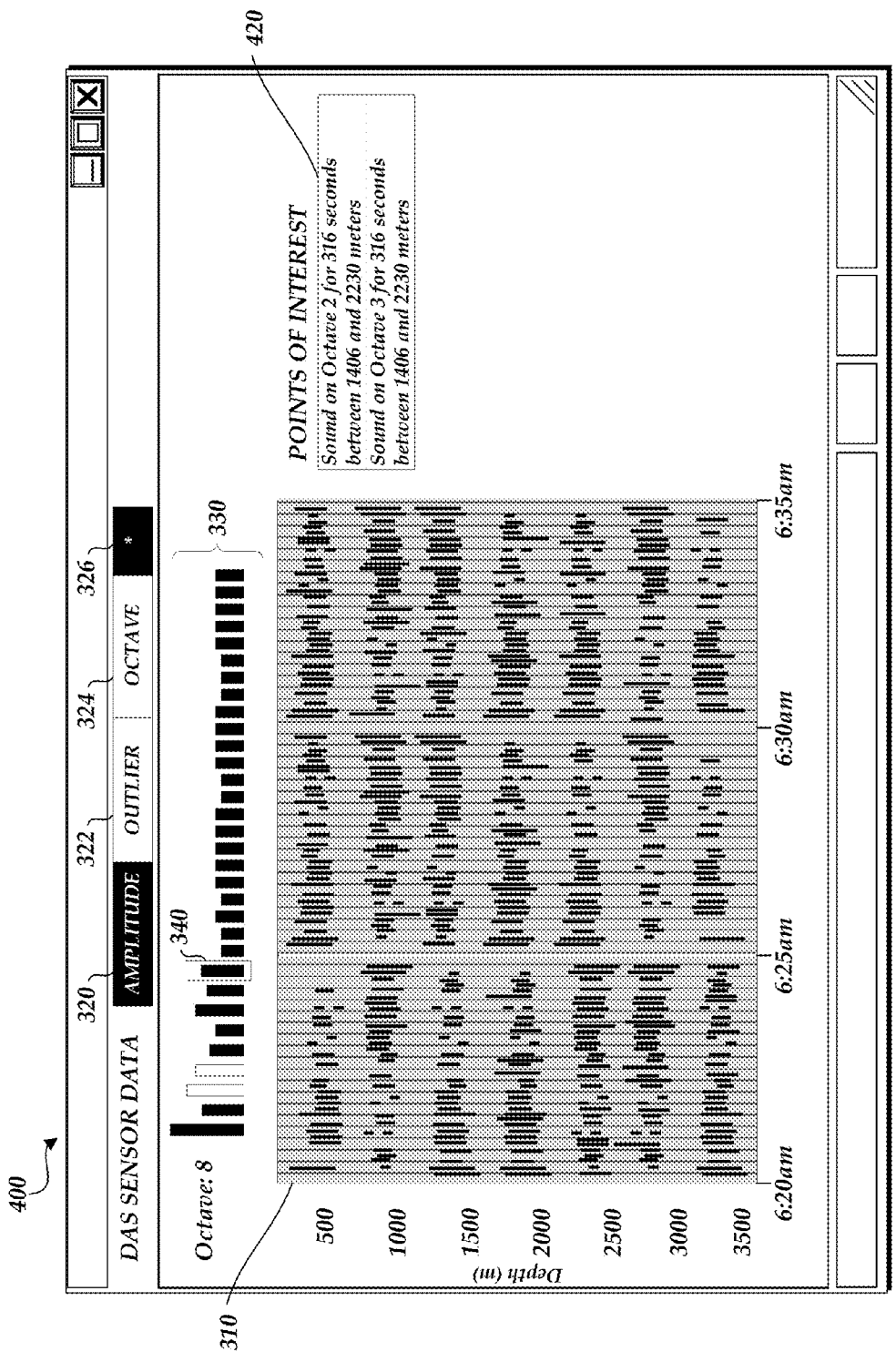
FIGS. 4A-4D illustrate a user interface that displays points of interest in the graph depicting the flattened acoustic data.

FIGS. 4A-4D illustrate a user interface 400 that displays points of interest in the graph 310 depicting the flattened acoustic data. As illustrated in FIG. 4A, the user has now selected the amplitude button 320 and the point of interest button 326. The point of interest button 326, when selected, causes the user interface 400 to provide information indicating in which octaves and at what times and/or depths an anomaly has been detected. An anomaly may be an event detected by the feature extractor 144 in a manner as described above, such as by matching an event fingerprint associated with a known anomaly (or other event) to sensor data. For example, the user interface 400 may modify the list of selectable octaves 330 to indicate in what octaves anomalies are detected. For illustrative purposes, octaves 2 and 3 are shaded white to indicate that an anomaly was detected in octaves 2 and 3. Thus, the user may be able to identify the octaves in which an anomaly occurred even while viewing the tiles associated with a different octave (e.g., octave 8 in this case).

Furthermore, the user interface 400 may include a point of interest box 420 that provides additional details on the detected anomaly. For example, the point of interest box 420 may indicate what was detected (e.g., a sound), in which octave(s) the anomaly was detected (e.g., octaves 2 and 3), a duration of the anomaly (e.g., 316 seconds), and a range of depths in which the anomaly was detected (e.g., 1406 to 2230 meters deep).

Figure 4B:
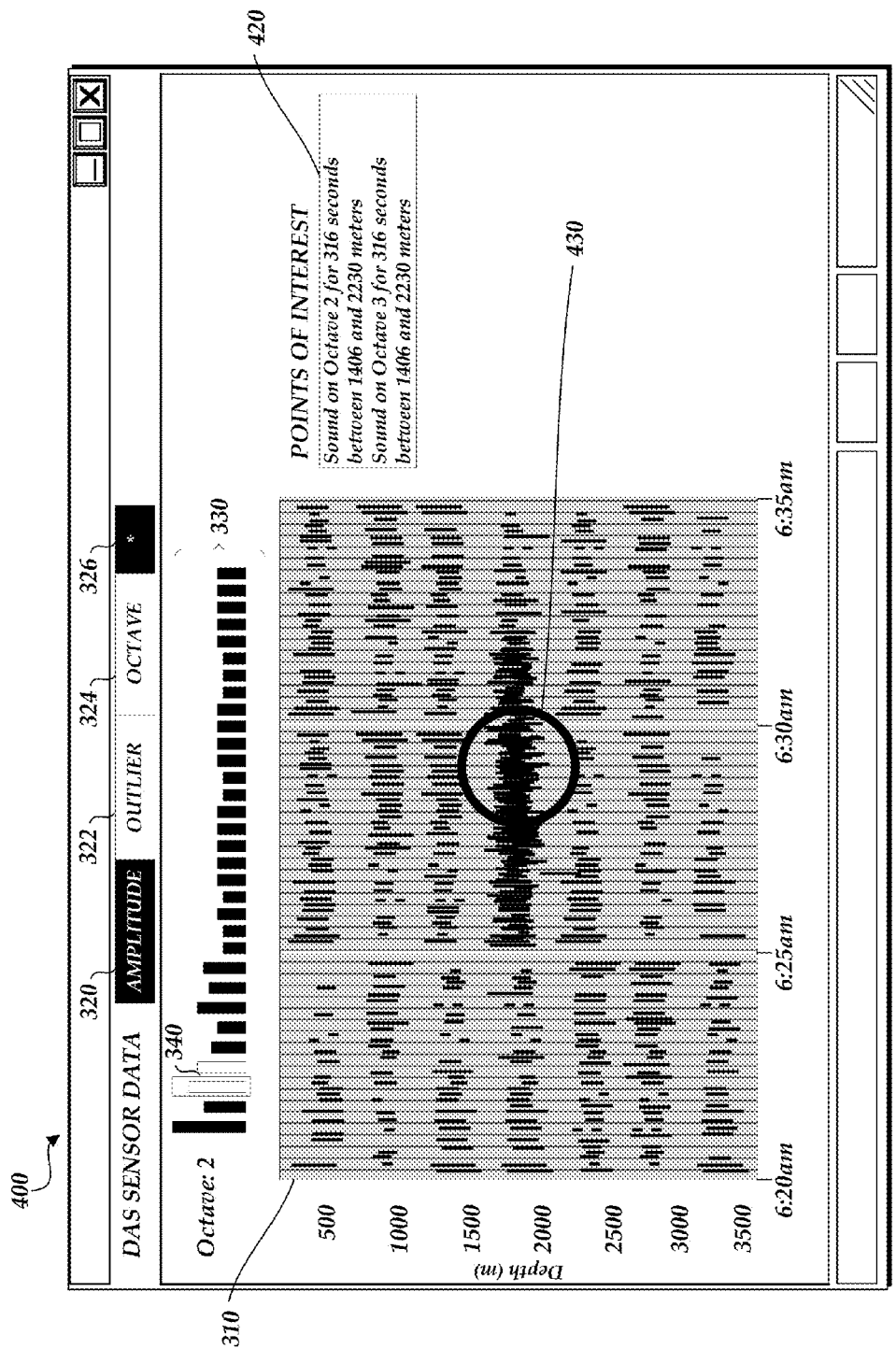

As illustrated in FIG. 4B, the user may select octave 2 in the list of selectable octaves 330 to view a visualization of the detected anomaly, as indicated by box 340. Upon selecting octave 2, the graph 310 begins to display the tiles associated with octave 2. In addition, the graph 310 includes a marker 430 that is placed at a location in the graph 310 that corresponds with a depth range and/or time range in which the anomaly was detected. Thus, the location of the marker 430 may correspond with the values present in the point of interest box 420. The feature extractor 144 may have detected an anomaly at the location of the marker 430 because, for example, there is a high concentration of tiles indicating large variations in amplitude at the location (e.g., a loud noise may have been detected).

Figure 4C:
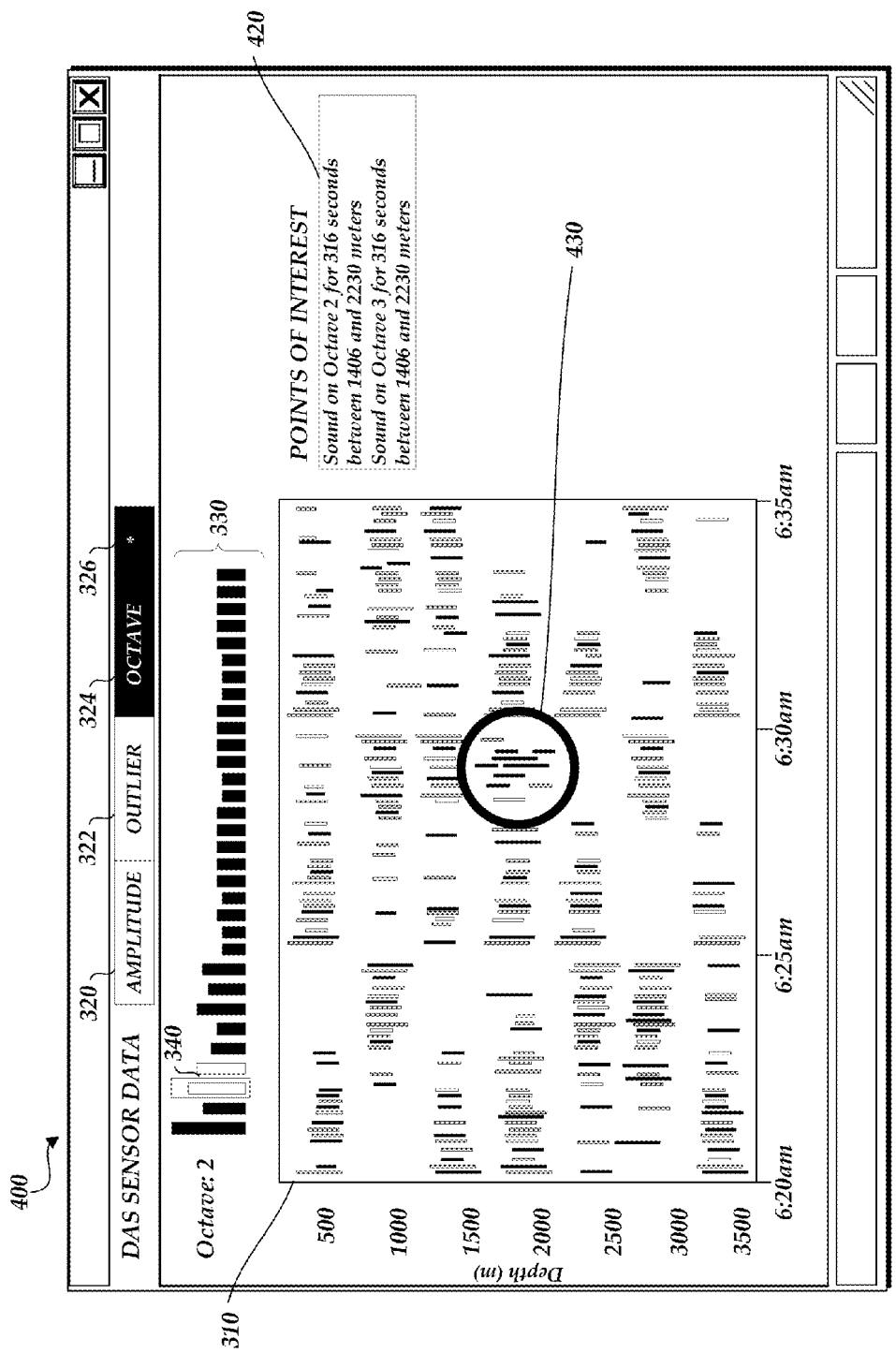

As illustrated in FIG. 4C, the user has now selected the octave button 324 while the point of interest button 326 is still selected. Accordingly, the graph 310 begins to display all tiles, regardless of octave, that represent variations in amplitude that exceed the threshold value. The marker 430 may remain in the graph 310 to aid the user in identifying the depths and/or times in which the anomaly was detected.

Figure 4D:
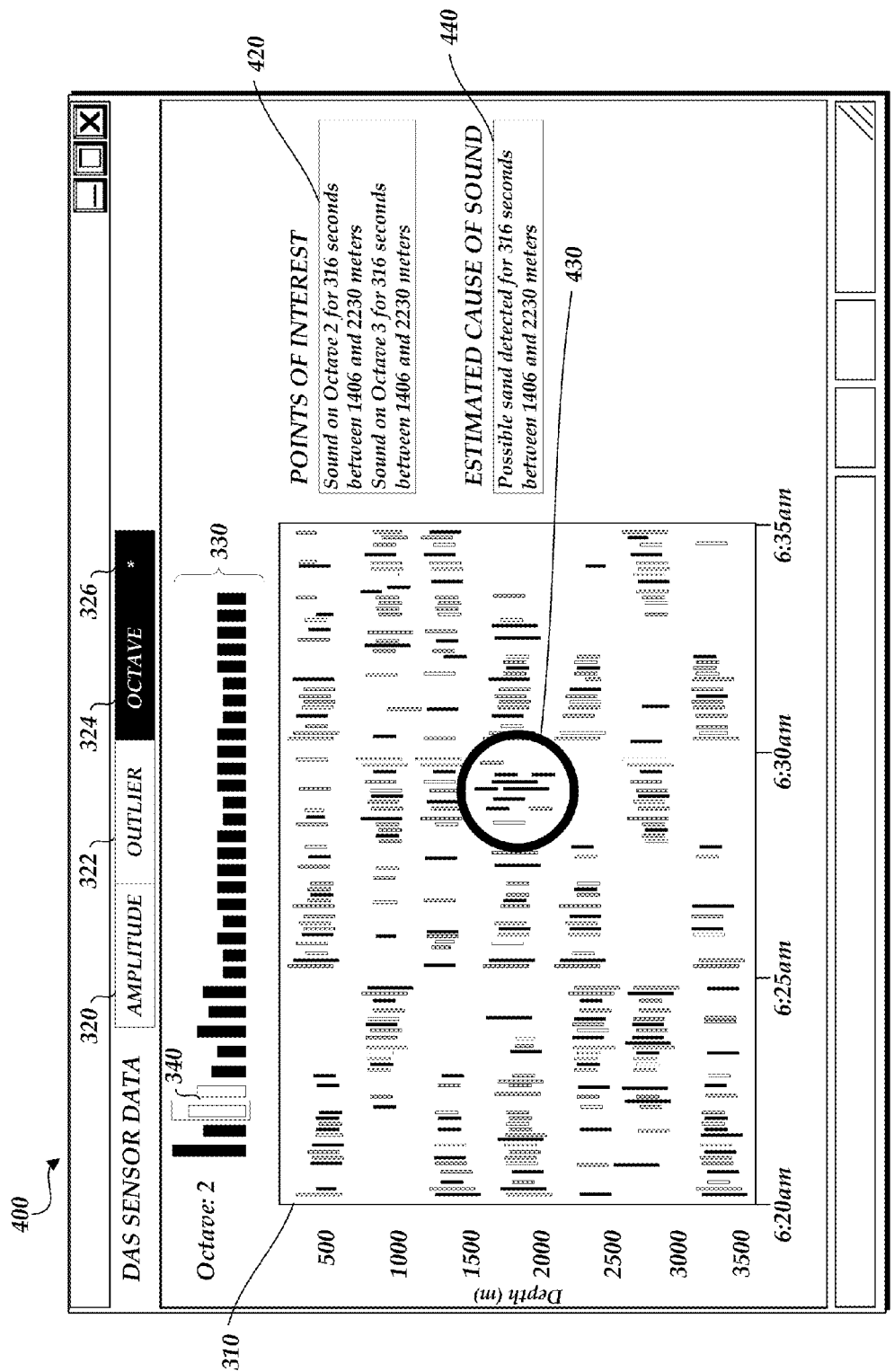

As illustrated in FIG. 4D, the user interface 400 may further include an estimation box 440. In an embodiment, the feature extractor 144 estimates what could have caused the anomaly to occur. The estimation may be based on the event signature that matched or closely matched the compressed data at the location of the marker 430. The estimation box 440 may provide information on the estimation generated by the feature extractor 144. For example, sand (entering a well) may have caused the detected anomaly.

Figure 5:
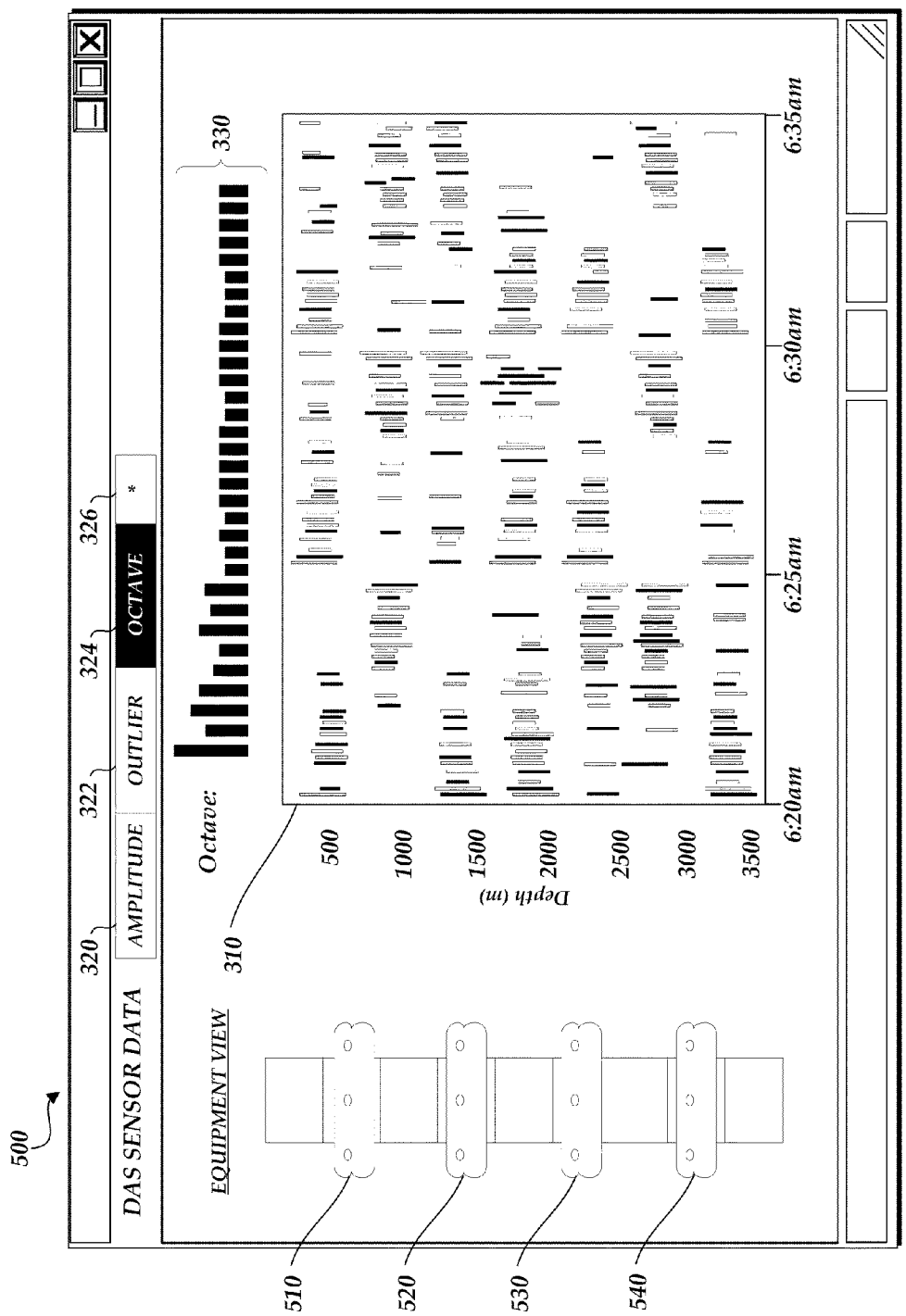
FIG. 5 illustrates a user interface displaying a representation of equipment located at various depths in a sensor collection site adjacent to a graph depicting the flattened acoustic data.

FIG. 5 illustrates a user interface 500 displaying a representation of equipment located at various depths in the sensor collection site 110 adjacent to the graph 310 depicting the flattened acoustic data. In an embodiment, the user may choose to view the components or equipment of the sensor collection site 110 that are located at the depths listed along the y-axis of the graph 310. Accordingly, the user interface 500 may display a representation of equipment 510, 520, 530, and 540 at locations within the user interface 500 that are parallel with the depths listed along the y-axis of the graph 310. The locations of the representation of equipment 510, 520, 530, and 540 may correspond with the actual depths of the respective equipment. For example, the equipment 510 may be located at a depth of 600 meters. Thus, the representation of the equipment 510 in the user interface 500 may be located in parallel with a marker along the y-axis of the graph 310 that represents 600 meters. In some embodiments, as the user scrolls up or down in the graph 310 (such that tiles at different depths are shown), the representations of the equipment in the sensor collection site 110 may be adjusted to reflect the equipment present at the depths depicted by the graph 310.

Figure 6:
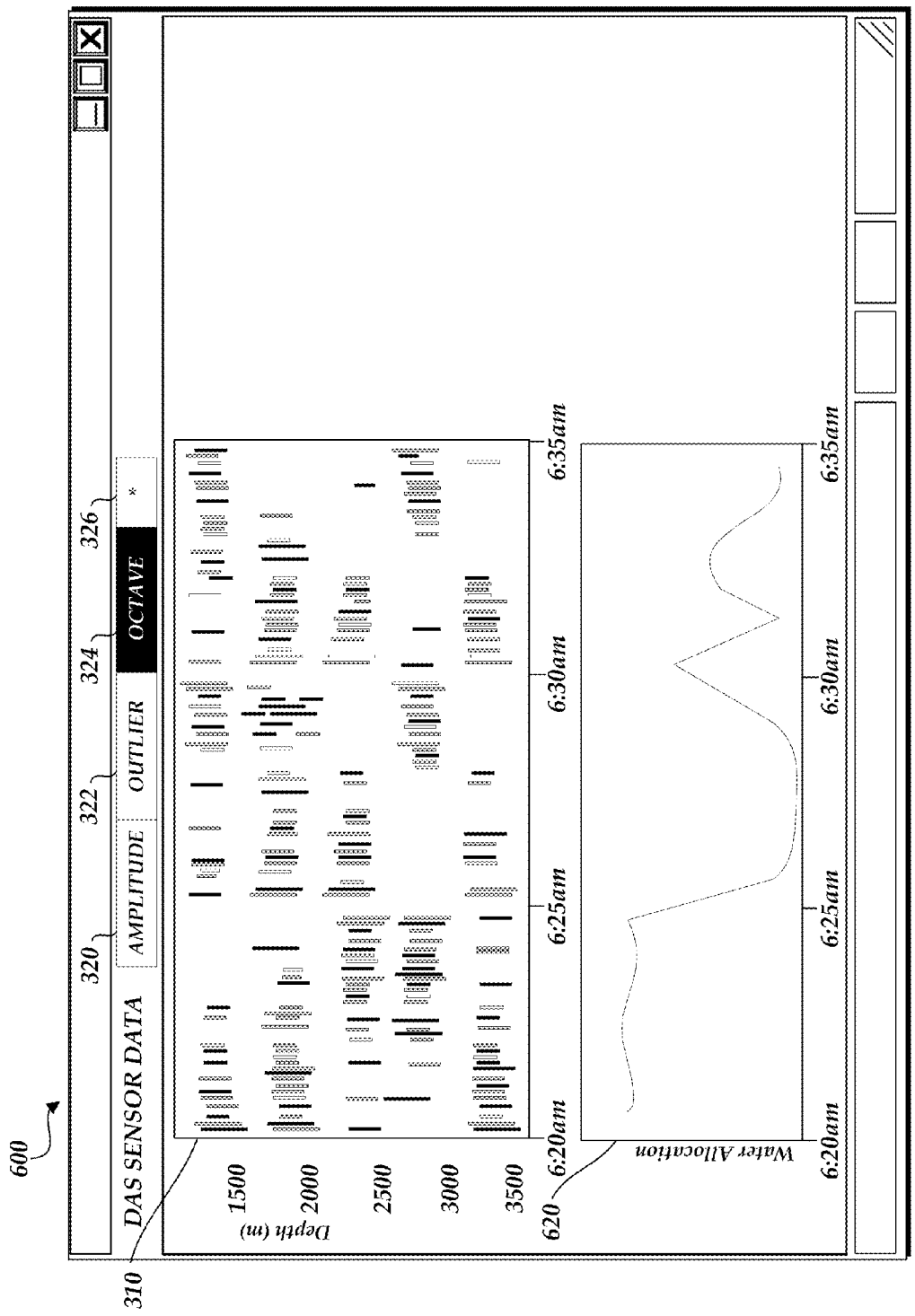
FIG. 6 illustrates a user interface displaying a graph depicting the flattened acoustic data adjacent to a time-series graph for a sensor during a common time period.

FIG. 6 illustrates a user interface 600 displaying the graph 310 depicting the flattened acoustic data adjacent to a time-series graph 620 for a sensor during a common time period. As illustrated in FIG. 6, the graph 310 includes tiles across a time range of 6:20 am to 6:35 am. Likewise, the time-series graph 620 depicts values measured by a sensor over the same time period. The sensor may be any sensor in the sensor collection site 110 or another sensor collection site.

In an embodiment, the graph 310 and the time-series graph 620 are linked such that a manipulation by the user of one graph causes an identical manipulation of the other graph. For example, a manipulation may include selecting a data point at a specific point in time in the graph 310, which may cause the selection of a data point in the time-series graph 620 at the same specific point in time. As another example, a manipulation may include scrolling in the time-series graph 620, which may cause an identical scrolling operation to occur in the graph 310. The linked manipulation of graphs is described in greater detail in U.S. patent application Ser. No. 14/871,465, titled "TIME-SERIES ANALYSIS SYSTEM" and filed on Sep. 30, 2015, which is hereby incorporated herein by reference in its entirety.

Figure 7:
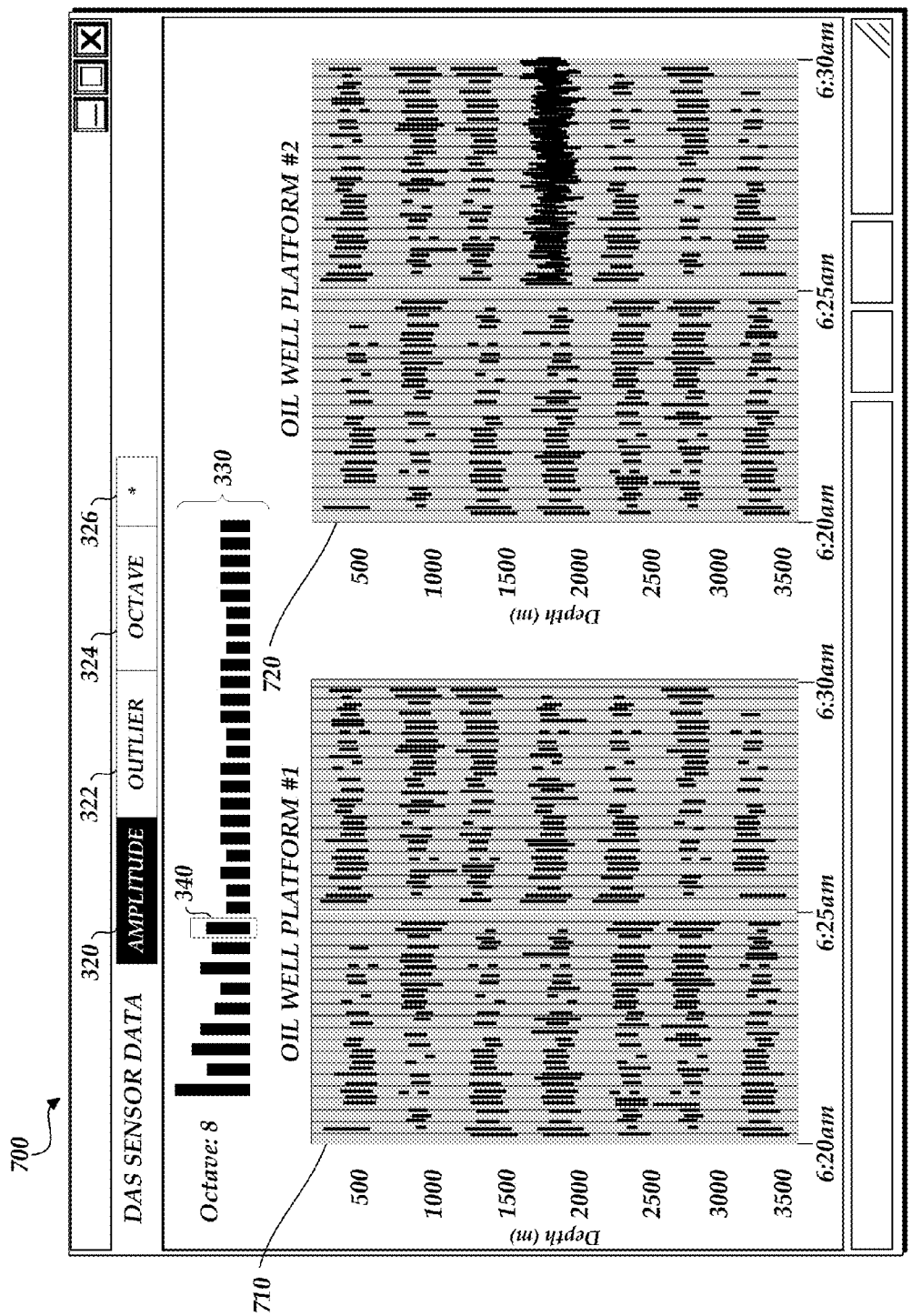
FIG. 7 illustrates a user interface displaying a graph depicting the flattened acoustic data for a first sensor collection site adjacent to a graph depicting the flattened acoustic data for a second sensor collection site.

FIG. 7 illustrates a user interface 700 displaying a graph 710 depicting the flattened acoustic data for a first sensor collection site adjacent to a graph 720 depicting the flattened acoustic data for a second sensor collection site. As illustrated in FIG. 7, the graphs 710 and 720 each include tiles for the selected octave 8. The graphs 710 and 720 may be linked such that a manipulation of one graph causes an identical manipulation of the other graph. While two graphs 710 and 720 are depicted in FIG. 7, this is not meant to be limiting. The user interface 700 may include any number of flattened acoustic (or temperature) data graphs for any number of sensor collection sites. In addition, multiple flattened acoustic (or temperature) data graphs may be depicted for the same sensor collection site. For example, each displayed flattened acoustic (or temperature) data graph may correspond to a different octave.

Figure 8:
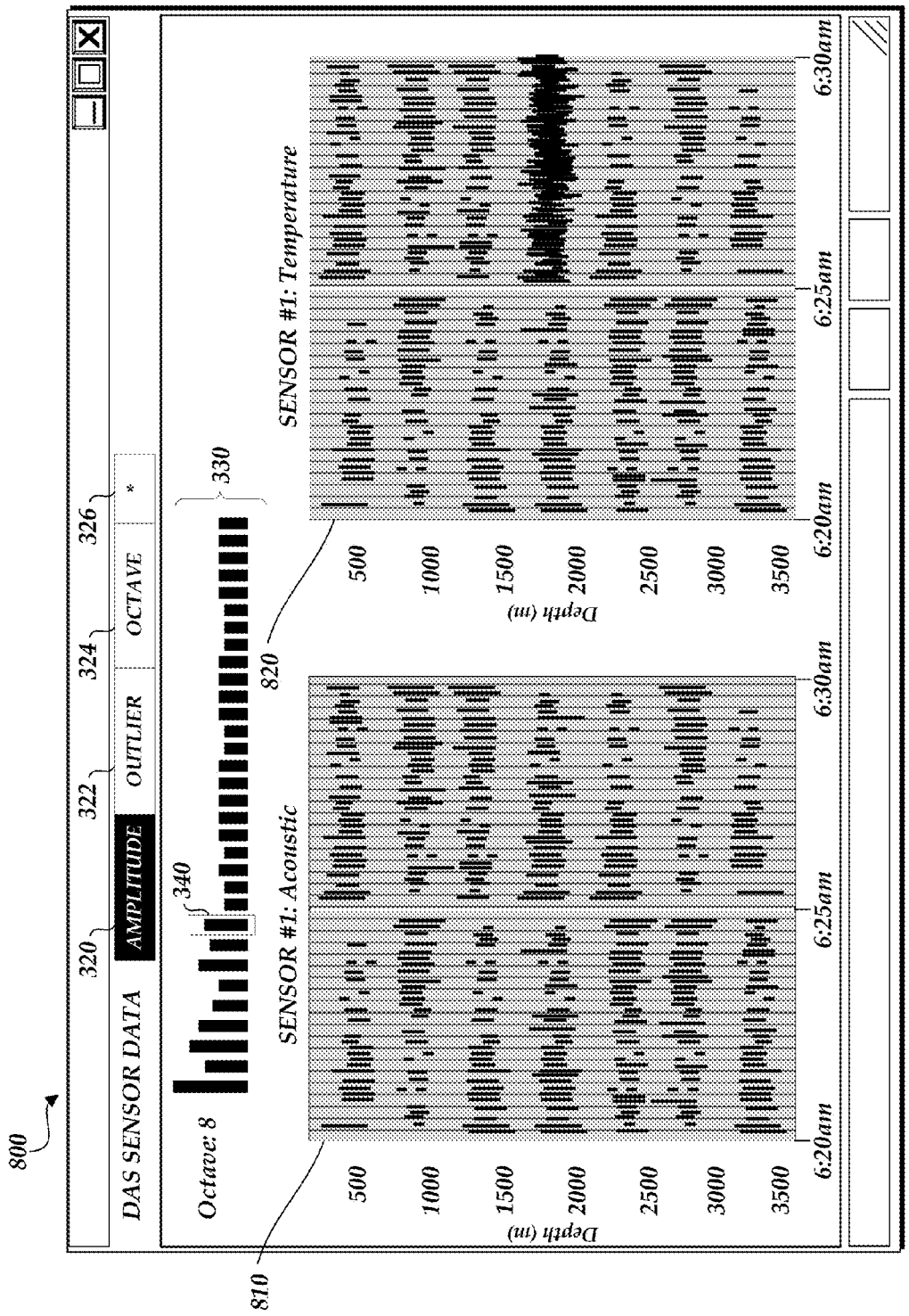
FIG. 8 illustrates a user interface displaying a graph depicting flattened acoustic data adjacent to a graph depicting flattened temperature data.

FIG. 8 illustrates a user interface 800 displaying a graph 810 depicting flattened acoustic data adjacent to a graph 820 depicting flattened temperature data. As illustrated in FIG. 8, the graphs 810 and 820 each include tiles for the selected octave 8. The graphs 810 and 820 may be linked such that a manipulation of one graph causes an identical manipulation of the other graph. While two graphs 810 and 820 are depicted in FIG. 8, this is not meant to be limiting. The user interface 800 may include any number of flattened data graphs corresponding to any type of physical property measured by the sensors 115.

Example Process Flow

Figure 9:
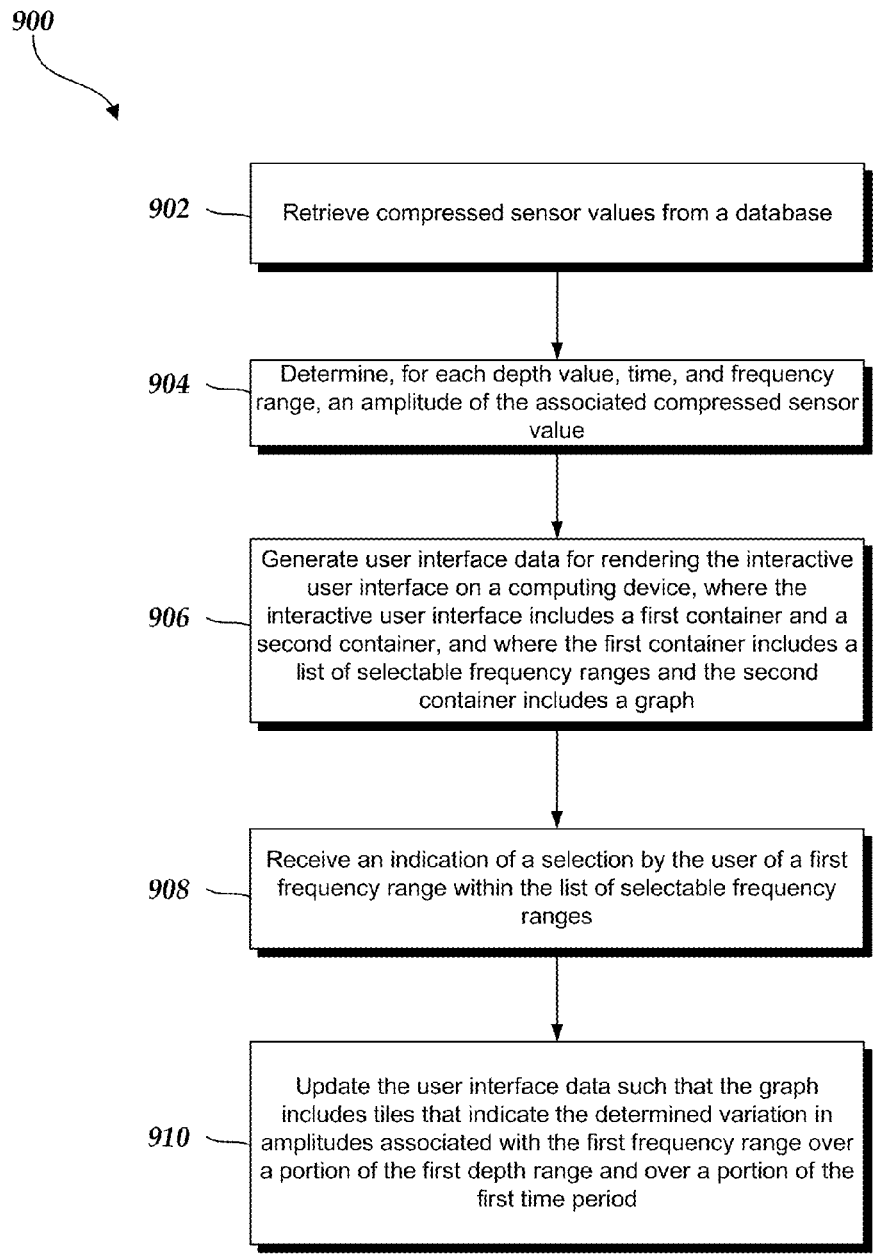
FIG. 9 is a flowchart depicting an illustrative operation of displaying flattened distributed acoustic sensing data to a user in an interactive user interface.

FIG. 9 is a flowchart 900 depicting an illustrative operation of displaying flattened distributed acoustic sensing data to a user in an interactive user interface. Depending on the embodiment, the method of FIG. 9 may be performed by various computing devices, such as by the DAS server 140 described above. Depending on the embodiment, the method of FIG. 9 may include fewer and/or additional blocks and the blocks may be performed in an order different than illustrated.

In block 902, compressed sensor values are retrieved from a database. For example, the compression system 130 described above may receive binned, raw data, reorganize the data, compress the reorganized data, and transmit the compressed data to the database for storage.

In block 904, for each depth value, time, and frequency range, an amplitude of the associated compressed sensor value is determined. The determination may be made based on parsing the compressed data retrieved from the database.

In block 906, user interface data for rendering the interactive user interface on a computing device is generated. The interactive user interface may include a first container and a second container. The first container may include a list of selectable frequency ranges and the second container may include a graph, such as a flattened acoustic data graph.

In block 908, an indication of a selection by the user of a first frequency range within the list of selectable frequency ranges is received. For example, the first frequency range may correspond with an octave that can be identified by an integer.

In block 910, the user interface data is updated such that the graph includes tiles that indicate variations in the determined amplitudes associated with the first frequency range over a portion of the first depth range and over a portion of the first time period. For example, the tiles may represent variations in the amplitudes over the portion of the first depth range and the portion of the first time period.

Implementation Mechanisms

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 10:
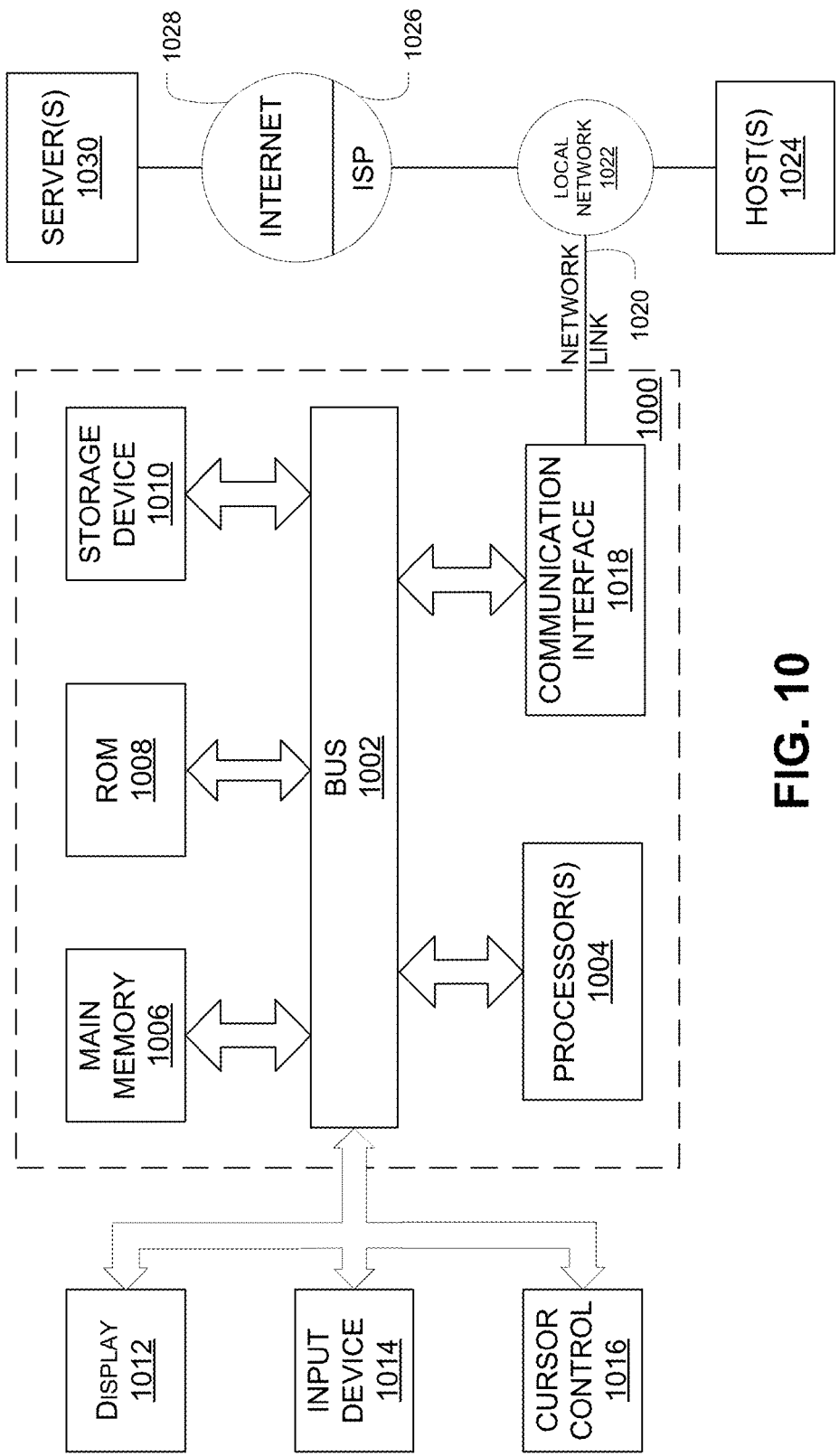
FIG. 10 illustrates a computer system with which certain methods discussed herein may be implemented, according to one embodiment.

For example, FIG. 10 is a block diagram that illustrates a computer system 1000 upon which an embodiment may be implemented. For example, any of the computing devices discussed herein may include some or all of the components and/or functionality of the computer system 1000.

Computer system 1000 includes a bus 1002 or other communication mechanism for communicating information, and a hardware processor, or multiple processors, 1004 coupled with bus 1002 for processing information. Hardware processor(s) 1004 may be, for example, one or more general purpose microprocessors.

Computer system 1000 also includes a main memory 1006, such as a random access memory (RAM), cache and/or other dynamic storage devices, coupled to bus 1002 for storing information and instructions to be executed by processor 1004. Main memory 1006 also may be used for storing temporary variables or other intermediate information during execution of instructions to be executed by processor 1004. Such instructions, when stored in storage media accessible to processor 1004, render computer system 1000 into a special-purpose machine that is customized to perform the operations specified in the instructions. Main memory 1006 may also store cached data, such as zoom levels and maximum and minimum sensor values at each zoom level.

Computer system 1000 further includes a read only memory (ROM) 1008 or other static storage device coupled to bus 1002 for storing static information and instructions for processor 1004. A storage device 1010, such as a magnetic disk, optical disk, or USB thumb drive (Flash drive), etc., is provided and coupled to bus 1002 for storing information and instructions. For example, the storage device 1010 may store measurement data obtained from a plurality of sensors.

Computer system 1000 may be coupled via bus 1002 to a display 1012, such as a cathode ray tube (CRT) or LCD display (or touch screen), for displaying information to a computer user. For example, the display 1012 can be used to display any of the user interfaces described herein with respect to FIGS. 2A through 8. An input device 1014, including alphanumeric and other keys, is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

Computing system 1000 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, Lua, C, or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage Computer system 1000 may implement the techniques described herein using customized hard-wired logic, one or more ASICs or FPGAs, firmware and/or program logic which in combination with the computer system causes or programs computer system 1000 to be a special-purpose machine. According to one embodiment, the techniques herein are performed by computer system 1000 in response to processor(s) 1004 executing one or more sequences of one or more instructions contained in main memory 1006. Such instructions may be read into main memory 1006 from another storage medium, such as storage device 1010. Execution of the sequences of instructions contained in main memory 1006 causes processor(s) 1004 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 1010. Volatile media includes dynamic memory, such as main memory 1006. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 1002. Transmission media can also take the form of acoustic or light waves, such as those generated during radio-wave and infra-red data communications.

Various forms of media may be involved in carrying one or more sequences of one or more instructions to processor 1004 for execution. For example, the instructions may initially be carried on a magnetic disk or solid state drive of a remote computer. The remote computer can load the instructions into its dynamic memory and send the instructions over a telephone line using a modem. A modem local to computer system 1000 can receive the data on the telephone line and use an infra-red transmitter to convert the data to an infra-red signal. An infra-red detector can receive the data carried in the infra-red signal and appropriate circuitry can place the data on bus 1002. Bus 1002 carries the data to main memory 406, from which processor 1004 retrieves and executes the instructions. The instructions received by main memory 1006 may retrieve and execute the instructions. The instructions received by main memory 1006 may optionally be stored on storage device 1010 either before or after execution by processor 1004.

Computer system 1000 also includes a communication interface 1018 coupled to bus 1002. Communication interface 1018 provides a two-way data communication coupling to a network link 1020 that is connected to a local network 1022. For example, communication interface 1018 may be an integrated services digital network (ISDN) card, cable modem, satellite modem, or a modem to provide a data communication connection to a corresponding type of telephone line. As another example, communication interface 1018 may be a local area network (LAN) card to provide a data communication connection to a compatible LAN (or WAN component to communicated with a WAN). Wireless links may also be implemented. In any such implementation, communication interface 1018 sends and receives electrical, electromagnetic or optical signals that carry digital data streams representing various types of information.

Network link 1020 typically provides data communication through one or more networks to other data devices. For example, network link 1020 may provide a connection through local network 1022 to a host computer 1024 or to data equipment operated by an Internet Service Provider (ISP) 1026. ISP 1026 in turn provides data communication services through the world wide packet data communication network now commonly referred to as the "Internet" 1028. Local network 1022 and Internet 1028 both use electrical, electromagnetic or optical signals that carry digital data streams. The signals through the various networks and the signals on network link 1020 and through communication interface 1018, which carry the digital data to and from computer system 1000, are example forms of transmission media.

Computer system 1000 can send messages and receive data, including program code, through the network(s), network link 1020 and communication interface 1018. In the Internet example, a server 1030 might transmit a requested code for an application program through Internet 1028, ISP 1026, local network 1022 and communication interface 1018.

The received code may be executed by processor 1004 as it is received, and/or stored in storage device 1010, or other non-volatile storage for later execution.

Terminology

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry. The term "substantially" when used in conjunction with the term "real-time" forms a phrase that will be readily understood by a person of ordinary skill in the art. For example, it is readily understood that such language will include speeds in which no or little delay or waiting is discernible, or where such delay is sufficiently short so as not to be disruptive, irritating or otherwise vexing to user.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

What is claimed is:

1. A computing system configured to access one or more databases in substantially real-time in order to determine information related to measured data points and provide the determined information to a user in an interactive user interface, the computing system comprising:
   one or more computer processors;
   a database storing compressed sensor values; and
   a computer readable storage medium storing program instructions configured for execution by the one or more computer processor in order to cause the computing system to:
      receive raw sensor values from a plurality of sensors located at various depths in a physical structure, wherein the raw sensor values correspond to a first number of values a second;

bin the received raw sensor values such that the binned raw sensor values correspond to a second number of values a second, wherein the second number is less than the first number;

aggregate the binned sensor values, wherein the aggregated binned sensor values comprise a plurality of rows, and wherein each row in the plurality of rows comprises a time value, a depth value, a frequency range, and an amplitude;

traverse each row in the plurality of rows and place a representation of the time value in the respective row in a first row;

traverse each row in the plurality of rows and place the depth value in the respective row in a second row;

traverse each row in the plurality of rows and place the frequency range in the respective row in a third row;

traverse each row in the plurality of rows and place the amplitude in the respective row in a fourth row;

compress the first row, the second row, the third row, and the fourth row to generate compressed sensor values;

access the compressed sensor values from the database; and generate user interface data for rendering the interactive user interface on a computing device, wherein the interactive user interface displays a representation of one or more of the compressed sensor values.

2. The computing system of claim 1, wherein the computer readable storage medium further stores program instructions that cause the computing system to for each time value in the first row after a first time value in the first row, identify a difference between a previous time value in the first row and the respective time value, wherein the representation of the respective time value comprises the identified difference.

3. The computing system of claim 2, wherein the computer readable storage medium further stores program instructions that cause the computing system to:
determine that each identified difference in the first row is a same value; and
replace all of the identified differences in the first row with the determined same value.

4. The computing system of claim 1, wherein the computer readable storage medium further stores program instructions that cause the computing system to zip the first row, the second row, the third row, and the fourth row to generate the compressed sensor values.

5. The computing system of claim 1, wherein the interactive user interface includes a first container and a second container, wherein the first container includes a list of selectable frequency ranges and the second container includes a graph, wherein each frequency range in the list of selectable frequency ranges corresponds to an octave at which the plurality of sensors detect sound, wherein the graph identifies a plurality of time intervals and a plurality of depth ranges, wherein the time value associated with each compressed sensor value corresponds with a time interval in the plurality of time intervals, wherein the depth value associated with each compressed sensor value corresponds with a depth range in the plurality of depth ranges, and wherein the computer readable storage medium further stores program instructions that cause the computing system to:
receive an identification of a selection by the user of a first frequency range within the list of selectable frequency ranges; and
for each time interval, frequency range, and depth range, determine a variation in amplitudes of compressed sensor values,
based on the determined variations in amplitudes, determine one or more tiles having one or more characteristics indicating the determined variation in amplitudes, and
display the one or more tiles in the graph.

6. The computing system of claim 5, wherein each time indicates a single determined amplitude, and wherein the one or more tiles are shaded according to a value of the respective determined amplitude.

7. The computing system of claim 5, wherein the computer readable storage medium further stores program instructions that cause the computing system to:
receive an identification of a selection by the user of an outlier button;
compute a mean and standard deviation of the determined variation in amplitudes associated with the first frequency range; and
display the one or more tiles in the graph that have a characteristic indicating the determined variation in amplitudes exceeds two standard deviations from the computed mean.

8. The computing system of claim 5, wherein the computer readable storage medium further stores program instructions that cause the computing system to:
receive an identification of a selection by the user of an octave button;
compute a mean and standard deviation of the determined variation in amplitudes associated with each frequency range in the list of selectable frequency ranges; and
display the one or more tiles in the graph that have a characteristic indicating the determined variation in amplitudes exceeds two standard deviations from the computed mean over the first depth range and the first time period.

9. The computing system of claim 5, wherein the interactive user interface includes a third container that comprises a representation of equipment associated with the plurality of sensors, and wherein the representation of the equipment is located adjacent to the second container such that the representation corresponds with depth values in the first depth range.

10. The computing system of claim 5, wherein the computer readable storage medium further stores program instructions that cause the computing system to:
receive an identification of a selection by the user of a point of interest button;
compute a mean and standard deviation of the determined amplitudes associated with each frequency range in the list of selectable frequency ranges;
determine a second depth range within the first depth range and a second time period within the first time period in which the determined amplitudes exceed the standard deviation for a threshold time period;
retrieve event information from an event database for events that occurred during the second time period within the second depth range; and
update the user interface data such that the interactive user interface includes a third container that comprises the event information and such that the graph includes a marker identifying the one or more tiles that are located within the second time period and the second depth range.

11. The computing system of claim 10, wherein the computer readable storage medium further stores program instructions that cause the computing system to identify acoustic signatures based on the determined amplitudes that exceed the standard deviation for the threshold time period.

12. The computing system of claim 10, wherein the computer readable storage medium further stores program instructions that cause the computing system to identify thermal signatures based on the determined amplitudes that exceed the standard deviation for the threshold time period.

13. The computing system of claim 1, wherein the plurality of sensors extract at least one of acoustic data or temperature data from the physical apparatus.

14. A computer-implemented method comprising:
as implemented by one or more computer systems comprising computer hardware and memory, the one or more computer systems configured with specific executable instructions,
receiving raw sensor values from a plurality of sensors located at various depths in a physical structure, wherein the raw sensor values correspond to a first number of values a second;
binning the received raw sensor values such that the binned raw sensor values correspond to a second number of values a second, wherein the second number is less than the first number;
aggregating the binned sensor values, wherein the aggregated binned sensor values comprise a plurality of rows, and wherein each row in the plurality of rows comprises a time value, a depth value, a frequency range, and an amplitude;
traversing each row in the plurality of rows and place a representation of the time value in the respective row in a first row;
traversing each row in the plurality of rows and place the depth value in the respective row in a second row;
traversing each row in the plurality of rows and place the frequency range in the respective row in a third row;
traversing each row in the plurality of rows and place the amplitude in the respective row in a fourth row;
compressing the first row, the second row, the third row, and the fourth row to generate compressed sensor values;
accessing the compressed sensor values from the database; and
generating user interface data for rendering an interactive user interface on a computing device, wherein the interactive user interface displays a representation of one or more of the compressed sensor values.

15. The method of claim 14, further comprising for each time value in the first row after a first time value in the first row, identify a difference between a previous time value in the first row and the respective time value, wherein the representation of the respective time value comprises the identified difference.

16. The method of claim 15, further comprising:
determining that each identified difference in the first row is a same value; and
replacing all of the identified differences in the first row with the determined same value.

17. The method of claim 14, wherein compressing the first row, the second row, the third row, and the fourth row further comprises zipping the first row, the second row, the third row, and the fourth row to generate the compressed sensor values.

18. The method of claim 14, wherein the interactive user interface includes a first container and a second container, wherein the first container includes a list of selectable frequency ranges and the second container includes a graph, wherein each frequency range in the list of selectable frequency ranges corresponds to an octave at which the plurality of sensors detect sound, wherein the graph identifies a plurality of time intervals and a plurality of depth ranges, wherein the time value associated with each compressed sensor value corresponds with a time interval in the plurality of time intervals, wherein the depth value associated with each compressed sensor value corresponds with a depth range in the plurality of depth ranges, and wherein the method further comprises:
receiving an identification of a selection by the user of a first frequency range within the list of selectable frequency ranges; and
for each time interval, frequency range, and depth range,
determining a variation in amplitudes of compressed sensor values,
based on the determined variations in amplitudes, determining one or more tiles having one or more characteristics indicating the determined variation in amplitudes, and
displaying the one or more tiles in the graph.

19. The method of claim 18, further comprising:
receiving an identification of a selection by the user of an outlier button;
computing a mean and standard deviation of the determined variation in amplitudes associated with the first frequency range; and
displaying the one or more tiles in the graph that have a characteristic indicating the determined variation in amplitudes exceeds two standard deviations from the computed mean.

20. The method of claim 18, further comprising:
receiving an identification of a selection by the user of an octave button;
computing a mean and standard deviation of the determined variation in amplitudes associated with each frequency range in the list of selectable frequency ranges; and
displaying the one or more tiles in the graph that have a characteristic indicating the determined variation in amplitudes exceeds two standard deviations from the computed mean over the first depth range and the first time period.

* * * * *